(12) United States Patent
Kim et al.

(10) Patent No.: US 7,879,968 B2
(45) Date of Patent: Feb. 1, 2011

(54) POLYMER COMPOSITIONS AND GOLF BALLS WITH REDUCED YELLOWING

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 777 days.

(21) Appl. No.: 11/809,432

(22) Filed: May 31, 2007

(65) Prior Publication Data

US 2008/0090678 A1    Apr. 17, 2008

Related U.S. Application Data

(60) Provisional application No. 60/852,582, filed on Oct. 17, 2006.

(51) Int. Cl.
*A63B 37/12* (2006.01)
*A63B 37/00* (2006.01)
*C08G 18/32* (2006.01)
*C08G 18/48* (2006.01)

(52) U.S. Cl. ............... 528/76; 528/61; 528/64; 528/68; 473/373; 473/374; 473/376; 473/378; 473/385

(58) Field of Classification Search ............ None
See application file for complete search history.

(56) References Cited

U.S. PATENT DOCUMENTS

| | | | |
|---|---|---|---|
| 3,265,272 A | 8/1966 | Smith | |
| 3,492,245 A | 1/1970 | Calderon et al. | |
| 3,726,835 A * | 4/1973 | Bertozzi | 528/61 |
| 3,804,803 A | 4/1974 | Streck et al. | |
| 3,989,568 A | 11/1976 | Isaac | |
| 4,115,475 A | 9/1978 | Foy et al. | |
| 4,123,061 A | 10/1978 | Dusbiber | |
| 4,195,015 A | 3/1980 | Deleens et al. | |
| 4,230,828 A | 10/1980 | Gaul, Jr. et al. | |
| 4,248,432 A | 2/1981 | Hewitt et al. | |
| 4,331,786 A | 5/1982 | Foy et al. | |
| 4,332,920 A | 6/1982 | Foy et al. | |
| 4,349,657 A | 9/1982 | Holloway | |
| 4,839,441 A | 6/1989 | Cuzin et al. | |
| 4,864,014 A | 9/1989 | Cuzin et al. | |
| 4,894,411 A | 1/1990 | Okada et al. | |
| 5,334,673 A | 8/1994 | Wu | |
| 5,384,385 A * | 1/1995 | Trinks et al. | 528/52 |
| 5,385,776 A | 1/1995 | Maxfield et al. | |
| 5,436,295 A | 7/1995 | Nishikawa et al. | |
| 5,484,870 A | 1/1996 | Wu | |
| 5,962,553 A | 10/1999 | Ellsworth | |
| 6,012,991 A | 1/2000 | Kim et al. | |
| 6,042,489 A | 3/2000 | Renard et al. | |
| 6,100,321 A | 8/2000 | Chen | |
| 6,183,382 B1 | 2/2001 | Kim et al. | |
| 6,329,458 B1 | 12/2001 | Takesue et al. | |
| 6,361,455 B1 * | 3/2002 | Takemura | 473/378 |
| 6,426,387 B1 | 7/2002 | Kim | |
| 6,508,725 B1 | 1/2003 | Kim | |
| 6,525,157 B2 | 2/2003 | Cozewith et al. | |
| 6,562,906 B2 | 5/2003 | Chen | |
| 6,592,472 B2 | 7/2003 | Dewanjee | |
| 6,616,552 B2 | 9/2003 | Takesue et al. | |
| 6,719,646 B2 | 4/2004 | Calabria et al. | |
| 6,776,942 B2 | 8/2004 | Kim | |
| 6,793,864 B1 | 9/2004 | Dewanjee et al. | |
| 6,794,447 B1 | 9/2004 | Kim et al. | |
| 6,861,474 B2 | 3/2005 | Kim | |
| 6,878,075 B2 | 4/2005 | Kim | |
| 6,924,337 B2 | 8/2005 | Kim et al. | |
| 6,930,150 B2 | 8/2005 | Kim et al. | |
| 6,939,924 B2 | 9/2005 | Kim et al. | |
| 6,974,854 B2 | 12/2005 | Dewanjee | |
| 7,001,286 B2 | 2/2006 | Kim et al. | |
| 7,026,399 B2 | 4/2006 | Kim et al. | |
| 7,037,985 B2 | 5/2006 | Kim et al. | |
| 7,041,769 B2 | 5/2006 | Wu et al. | |
| 7,163,471 B2 | 1/2007 | Kim et al. | |
| 7,169,861 B2 | 1/2007 | Kim et al. | |
| 7,332,533 B2 | 2/2008 | Kim et al. | |
| 2002/0049099 A1 * | 4/2002 | Peter | 473/378 |
| 2002/0061792 A1 * | 5/2002 | Yagley et al. | 473/370 |

(Continued)

OTHER PUBLICATIONS

Saunders, "Polyurethanes Chemistry and Technology Part I", 1962; pp. 32-43.*

(Continued)

*Primary Examiner*—David Buttner
(74) *Attorney, Agent, or Firm*—Klarquist Sparkman, LLP

(57) ABSTRACT

The present invention concerns reduced-yellowing thermoplastic or thermoset polymer compositions derived from the reaction of a diisocyanate, a polyol or polyamine, and a dicyandiamide. The present invention also concerns golf balls comprising the reduced-yellowing thermoplastic or thermoset polymer compositions derived from the reaction of a diisocyanate, a polyol or polyamine, and a dicyandiamide. The present invention also relates to a method for making a golf ball which includes using reduced yellowing compositions derived from the reaction of a diisocyanate, a polyol or polyamine, and a dicyandiamide. The resulting golf balls have similar processability and physical properties (such as resiliency and shear resistance) as golf balls made from conventional polyurethane or polyurea formulations, while exhibiting substantially improved resistance to yellowing.

8 Claims, 2 Drawing Sheets

U.S. PATENT DOCUMENTS

| | | |
|---|---|---|
| 2003/0012902 A1 | 1/2003 | Kim et al. |
| 2003/0096661 A1 | 5/2003 | Kim |
| 2003/0158312 A1 | 8/2003 | Chen |
| 2003/0224871 A1 | 12/2003 | Kim et al. |
| 2004/0059062 A1 | 3/2004 | Kim |
| 2004/0092336 A1 | 5/2004 | Kim et al. |
| 2004/0097653 A1 | 5/2004 | Kim et al. |
| 2004/0180733 A1 | 9/2004 | Kim |
| 2004/0201133 A1 | 10/2004 | Dewanjee et al. |
| 2004/0236030 A1 | 11/2004 | Kim et al. |
| 2004/0248669 A1 | 12/2004 | Kim et al. |
| 2004/0248670 A1 | 12/2004 | Okamoto et al. |
| 2004/0248671 A1 | 12/2004 | Kim et al. |
| 2004/0248672 A1 | 12/2004 | Jeon et al. |
| 2004/0254298 A1 | 12/2004 | Kim et al. |
| 2005/0250601 A1 | 11/2005 | Kim et al. |
| 2005/0261424 A1 | 11/2005 | Snell et al. |
| 2006/0014898 A1 | 1/2006 | Kim |
| 2006/0030427 A1 | 2/2006 | Kim et al. |
| 2006/0166761 A1 | 7/2006 | Kim et al. |
| 2006/0166762 A1 | 7/2006 | Kim et al. |
| 2006/0172823 A1 | 8/2006 | Loper et al. |
| 2006/0247074 A1 | 11/2006 | Kim et al. |
| 2007/0015605 A1 | 1/2007 | Kim et al. |
| 2007/0054754 A1 | 3/2007 | Kim et al. |
| 2007/0100085 A1 | 5/2007 | Kim et al. |
| 2007/0142568 A1 | 6/2007 | Kim et al. |
| 2007/0232756 A1 | 10/2007 | Kim et al. |
| 2007/0238552 A1 | 10/2007 | Kim et al. |

OTHER PUBLICATIONS

U.S. Appl. No. 11/879,833, filed Jul. 18, 2007, Kim et al.
U.S. Appl. No. 12/005,553, filed Dec. 26, 2007, Kuttappa.
U.S. Appl. No. 12/005,875, filed Dec. 27, 2007, Snell et al.
Research Disclosure 29703, E.I. DuPont de Nemours & Co., 2 pages, Jan. 1989.

* cited by examiner

POLYMER COMPOSITIONS AND GOLF BALLS WITH REDUCED YELLOWING

CROSS REFERENCE TO RELATED APPLICATION

This application claims the benefit of the earlier filing date of U.S. provisional patent application No. 60/852,582, entitled Polymer Compositions and Golf Balls with Reduced Yellowing, which was filed on Oct. 17, 2006.

FIELD

The present invention relates to reduced-yellowing thermoplastic or thermoset polymer compositions derived from the reaction of a diisocyanate, a polyol or polyamine, and a dicyandiamide. The present invention also relates to golf balls comprising the reduced-yellowing thermoplastic or thermoset polymer compositions derived from the reaction of a diisocyanate, a polyol or polyamine, and a dicyandiamide. The present invention also relates to a method of making a golf ball which includes the use of the reduced yellowing compositions derived from the reaction of a diisocyanate, a polyol or polyamine, and a dicyandiamide. The resulting golf balls have similar processability and physical properties (such as resiliency and shear resistance) as golf balls made from conventional polyurethane or polyurea formulations while exhibiting substantially improved resistance to yellowing.

BACKGROUND

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover.

More modern golf balls can be classified as one-piece, two-piece, and three-piece. One-piece balls are molded from a homogeneous mass of material upon which is molded a dimple pattern. One-piece balls are inexpensive and very durable, but do not provide great distance because of relatively high spin and low velocity. Two-piece balls are made by molding a cover around a solid rubber core. These are the most popular types of balls in use today. In attempts to further modify the ball performance, especially in terms of the distance such balls travel, and the feel transmitted to the golfer through the club on striking the ball, the basic two-piece ball construction has been further modified by the introduction of additional layers between the core and outer cover layer. If one additional layer is introduced between the core and outer cover layer, a so called "three-piece ball" results, and similarly, if two additional layers are introduced between the core and outer cover layer, a so called "four-piece ball" results, and so on.

Conventionally, golf ball cover and intermediate layers are positioned over a core or other internal layer using one of three methods: casting, injection molding, or compression molding. Injection molding generally involves using a mold having one or more sets of two hemispherical mold sections that mate to form a spherical cavity during the molding process. The pairs of mold sections are configured to define a spherical cavity in their interior when mated. When used to mold an outer cover layer for a golf ball, the mold sections can be configured so that the inner surfaces that mate to form the spherical cavity include protrusions configured to form dimples on the outer surface of the molded cover layer. The mold sections are connected to openings, or gates, evenly distributed near or around the parting line, or point of intersection, of the mold sections through which the material to be molded flows into the cavity. The gates are connected to a runner and a sprue that serve to channel the molding material through the gates. When used to mold a layer onto an existing structure, such as a ball core, the mold includes a number of support pins disposed throughout the mold sections. The support pins are configured to be retractable, moving into and out of the cavity perpendicular to the spherical cavity surface. The support pins maintain the position of the core while the molten material flows through the gates into the cavity between the core and the mold sections. The mold itself may be a cold mold or a heated mold. In the case of a heated mold, thermal energy is applied to the material in the mold so that a chemical reaction may take place in the material. Thermoset materials have desirable mechanical properties, and hence would be beneficial to producers of golf balls using this process. Unfortunately, thermoset materials generally are not well suited for injection molding. As the reactants for thermoset polyurethane are mixed, they begin to cure and become highly viscous while traveling through the sprue and into the runners of the injection mold, leading to injection difficulties. For this reason, thermoset materials typically are formed into a ball layer using a casting process free of any injection molding steps.

In contrast to injection molding, which generally is used to prepare layers from thermoplastic materials, casting often is used to prepare layers from thermoset material (i.e., materials that cure irreversibly). In a casting process, the thermoset material is added directly to the mold sections immediately after it is created. Then, the material is allowed to partially cure to a gelatinous state, so that it will support the weight of a core. Once cured to this state, the core is positioned in one of the mold sections, and the two mold sections are then mated. The material then cures to completion, forming a layer around the core. The timing of the positioning of the core is crucial for forming a layer having uniform thickness. The equipment used for this positioning is costly, because the core must be centered in the material in its gelatinous state, and at least one of the mold sections, after having material positioned therein, must be turned over and positioned onto its corresponding mold section.

Compression molding a ball layer typically requires an initial step of making half shells by injection molding the layer material into a cold injection mold. The half shells then are positioned in a compression mold around a ball core, whereupon heat and pressure are used to mold the half shells into a complete layer over the core. Compression molding also can be used as a curing step after injection molding. In such a process, an outer layer of thermally curable material is injection molded around a core in a cold mold. After the material solidifies, the ball is removed and placed into a mold, in which heat and pressure are applied to the ball to induce curing in the outer layer.

Reaction injection molding is a processing technique used specifically for certain reactive thermosetting plastics. As mentioned above, by "reactive" it is meant that the polymer is formed from two or more components which react. Generally, the components, prior to reacting, exhibit relatively low viscosities. The low viscosities of the components allow using lower temperatures and pressures than those utilized in traditional injection molding. In reaction injection molding, the two or more components are combined and reacted to produce the final polymerized material. Mixing these separate components is critical, a distinct difference from traditional injection molding. The process of reaction injection molding a golf ball cover involves placing a golf ball core into a die, closing the die, injecting the reactive components into a mixing chamber where they combine, and transferring the combined material into the die. The mixing begins the polymerization reaction which is typically completed upon cooling of the cover material.

Finally, the mold material itself and any supporting pins and vent pins may be made at least in part from a porous metal material. The porous metal is suitable for use as part of an injection or compression mold. The porous metal can be used for all or part of the mold sections defining the spherical cavity. Other regions of the mold that can advantageously be made from porous metal include pins, runners, sprues, and any other parts of the mold which come into contact with the material from which the ball portions are formed. Full details of this mold design are disclosed in U.S. Pat. No. 6,776,942 to H. J. Kim, the entire contents of which are herein incorporated by reference.

Balata had been used as the primary material for covers of golf balls until the 1960's when SURLYN®, an ionomeric resin made by E.I. DuPont de Nemours & Co., was introduced to the golf industry. SURLYN® costs less than balata and has a better cut resistance than balata. At the present time, SURLYN® is used as the primary source of cover stock for most two-piece and some three-piece golf balls. The problem with SURLYN®-covered golf balls, however, is that they lack the "click" and "feel" which golfers had become accustomed to with balata. "Click" is the sound made when the ball is hit by a golf club while "feel" is the overall sensation imparted to the golfer when the ball is hit. However, unlike SURLYN®-covered golf balls, polyurethane- or polyurea-covered golf balls can be made to have the "click" and "feel" of balata.

Polyurethanes or polyureas typically are prepared by reacting a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In what is known as a one-shot process, the three reactants, diisocyanate, polyol or polyamine, and optionally a chain extender or a curing agent, are combined in one step. Alternatively, a two-step process may occur in which the first step involves reacting the diisocyanate and the polyol (in the case of polyurethane) or the polyamine (in the case of a polyurea) to form a so-called prepolymer, to which can then be added either the chain extender or the curing agent. This procedure is known as the prepolymer process.

In addition, although depicted as discrete component packages as above, it is also possible to control the degree of crosslinking, and hence the degree of thermoplastic or thermoset properties in a final composition, by varying the stoichiometry not only of the diisocyanate-to-chain extender or curing agent ratio, but also the initial diisocyanate-to-polyol or polyamine ratio. Of course in the prepolymer process, the initial diisocyanate-to-polyol or polyamine ratio is fixed on selection of the required prepolymer.

Of the two processes, the prepolymer process is thus preferred since it allows for greater control over the reaction. Nevertheless, golf balls in accordance with the present invention can be produced using either process.

In view of the aforementioned advantages of polyurethane and polyurea as a golf ball cover component, numerous patents have disclosed various formulations for these materials. For example, Hewitt, et al., U.S. Pat. No. 4,248,432 discloses a thermoplastic polyester urethane golf ball cover formed from a reaction product of a polyester glycol (formed from an aliphatic diol and an aliphatic dicarboxylic acid) with paraphenylene diisocyanate (PPDI) or cyclohexane diisocyanate, in the substantial absence of curing or crosslinking agents.

U.S. Pat. No. 4,123,061 teaches that a golf ball can be made from a polyurethane prepolymer of polyether and a curing agent, such as a trifunctional polyol, a tetrafunctional polyol or a diamine. The specific diamines taught by the '061 patent are 3,3'-dichlorobenzidene; 3,3'-dichloro-4,4'-diaminodiphenyl methane (MOCA); N,N,N',N'-tetrakis(2-hydroxypropyl) ethylenediamine and Curalon L, a trade name for a mixture of aromatic diamines sold by Uniroyal, Inc.

U.S. Pat. No. 3,989,568 teaches a three-component system employing either one or two polyurethane prepolymers and one or two curing agents. Both polyol and diamine curing agents are taught by the '568 patent.

Dusbiber, U.S. Pat. No. 4,123,061 discloses a polyurethane golf ball cover prepared from the reaction product of a polyether, a diisocyanate and a curing agent. The polyether may be polyalkylene ether glycol or polytetramethylene ether glycol, and that the diisocyanate may be TDI, 4,4"-diphenylmethane diisocyanate (MDI), and 3,3"-dimethyl-4,4"-biphenylene diisocyanate (TODI). Additionally, the curing agent may be either a polyol (either tri- or tetra-functional and not di-functional) such as triisopropanol amine (TIPA) or trimethylol propane (TMP), or an amine-type having at least two reactive amine groups.

Holloway, U.S. Pat. No. 4,349,657 discloses a method for preparing polyester urethanes with PPDI by reacting a polyester (e.g. prepared from aliphatic glycols having 2-8 carbons reacted with aliphatic dicarboxylic acids having 4-10 carbons) with a molar excess of PPDI to obtain an isocyanate-terminated polyester urethane (in liquid form and stable at reaction temperatures), and then reacting the polyester urethane with additional polyester.

Wu, U.S. Pat. No. 5,334,673 discloses a polyurethane prepolymer cured with a slow-reacting curing agent selected from slow-reacting polyamine curing agents and difunctional glycols (i.e., 3,5-dimethylthio-2,4-toluenediamine, 3,5-dimethylthio-2,6-toluenediamine, N,N"-dialkyldiamino diphenyl methane, trimethyleneglycol-di-p-aminobenzoate, polytetramethyleneoxide-di-p-aminobenzoate, 1,4-butanediol, 2,3-butanediol, 2,3-dimethyl-2,3-butanediol, ethylene glycol, and mixtures of the same).

Wu, U.S. Pat. No. 5,484,870 discloses golf balls having covers composed of a polyurea composition. The polyurea composition disclosed is a reaction product of an organic isocyanate having at least two functional groups and an organic amine having at least two functional groups. One of the organic isocyanates disclosed is PPDI.

Finally, in addition to discrete thermoplastic or thermoset materials, it also is possible to modify a thermoplastic polyurethane or polyurea composition by introducing materials in the composition that undergo subsequent curing after molding the thermoplastic to provide properties similar to those of a thermoset. For example, Kim in U.S. Pat. No. 6,924,337, the entire contents of which are hereby incorporated by reference, discloses a thermoplastic urethane or urea composition optionally comprising chain extenders and further comprising a peroxide or peroxide mixture, which can then undergo post curing to result in a thermoset.

Also, Kim et al. in U.S. Pat. No. 6,939,924, the entire contents of which are hereby incorporated by reference, discloses a thermoplastic urethane or urea composition, optionally also comprising chain extenders, that is prepared from a diisocyanate and a modified or blocked diisocyanate which unblocks and induces further cross linking post extrusion. The modified isocyanate preferably is selected from the group consisting of: isophorone diisocyanate (IPDI)-based uretdione-type crosslinker; a combination of a uretdione adduct of IPDI and a partially e-caprolactam-modified IPDI; a combination of isocyanate adducts modified by e-caprolactam and a carboxylic acid functional group; a caprolactam-modified Desmodur diisocyanate; a Desmodur diisocyanate having a 3,5-dimethylpyrazole modified isocyanate; or mixtures of these.

Finally, Kim et al. in U.S. Pat. No. 7,037,985 B2, the entire contents of which are hereby incorporated by reference, discloses thermoplastic urethane or urea compositions further comprising a reaction product of a nitroso compound and a diisocyanate or a polyisocyanate. The nitroso reaction product has a characteristic temperature at which it decomposes to regenerate the nitroso compound and diisocyanate or polyisocyanate. Thus, by judicious choice of the post-processing temperature, further crosslinking can be induced in the originally thermoplastic composition to provide thermoset-like properties.

Although the prior art has disclosed golf ball covers composed of many different polyurethane materials, none of these golf balls have proven completely satisfactory. A particular dissatisfaction has been the yellowing of thermoset or thermoplastic polyurethane or polyurea covers upon exposure to sunlight (ultraviolet radiation). Because the polyureas or polyurethanes used to make the covers of such golf balls generally contain an aromatic component, e.g., aromatic diisocyanate, polyol, or polyamine, they are susceptible to discoloration upon exposure to light, particularly ultraviolet (UV) light. To slow down the discoloration, light and UV stabilizers, e.g., TINUVIN® 770, 765, and 328, are added to these aromatic polymeric materials. However, to further ensure that the covers formed from aromatic polyurethanes do not appear discolored, the covers are painted with white paint and then covered with a clear coat to maintain the white color of the golf ball. The application of a uniform white pigmented coat to the dimpled surface of the golf ball is a difficult process that adds time and expense to the golf ball manufacturing process. In addition, when the paint and clear coat layers are compromised during play, due to scuffing or shear generated by the clubface, the UV protection afforded by the paint layer is compromised, which can lead to ball yellowing on further play.

Dewanjee, U.S. Pat. Nos. 6,592,472 and 6,974,854 discloses golf balls with covers composed of thermosetting polyurethane purportedly having increased resistance to yellowing. This was accomplished by providing a cover composed of a thermosetting polyurethane material formed from a toluene diisocyanate prepolymer and a curative composed of 20 to 40 parts 4,4"-methylenebis-(3-chloro,2,6-diethyl)-aniline and 80 to 60 parts diethyl 2,4-toluenediamine.

Also, U.S. Pat. No. 7,041,769, entitled "Polyurethane Compositions for Golf Balls," states that "[f]urthermore, because the polyurethanes and polyurea used to make the covers of such golf balls generally contain an aromatic component, e.g., aromatic diisocyanate, polyol or polyamine, they are susceptible to discoloration upon exposure to light, particularly ultraviolet (UV) light." U.S. Pat. No. 7,041,769, column 2, lines 21-26. The '769 patent discloses forming polycarbonate polyols, e.g., HO—[R—OCOO—]$_n$R—OH.

However, there remains a need for thermoset or thermoplastic polyurethane or polyurea covers that have reduced yellowing relative to known compositions. These compositions also have the other desired physical properties useful for making golf balls that are provided by conventional polyurea or polyurethane compositions.

SUMMARY

It has now been discovered that a mixture of a diisocyanate and a polyol or polyamine, or a prepolymer from such a mixture, in combination with one or more dicyandiamides, as either chain extender or curing agent, results in thermoplastic or thermoset polymer compositions, respectively. These polymer compositions have as good, if not better, processability (such as pot life, curing temperatures and times) and physical properties (such as resiliency and shear resistance) as golf balls made from conventional thermoplastic and thermoset formulations. These polymer compositions also exhibit substantially improved resistance to yellowing.

In addition to the obvious improvement in the appearance and visibility of a ball comprising such a reduced-yellowing composition, using such a composition to make golf balls minimizes or eliminates the number of paint layers that must be applied on the surface prior to addition of any pigmented topcoat. In some cases, the addition of a paint layer may consume up to 20% of the total dimple depth. Thus, using the composition of the present invention allows the effect of the dimple pattern on the aerodynamic properties of a ball to be greatly enhanced relative to balls having the same dimple pattern but with one or more paint layers.

In one embodiment, the invention is a golf ball including a cover layer, a central core and optionally one or more intermediate layers, where the cover layer includes the reaction product of one or more polyisocyanates; a reagent which is a polyol, or a polyamine or a combination of the two, and a chain extender or curing agent including one or more dicyandiamides having the general formula:

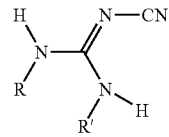

where R and R' independently are hydrogen, or a $C_1$-$C_{20}$ aliphatic, cycloaliphatic or aromatic moiety.

Particular embodiments concern compositions where the polyisocyanate can include either an aliphatic, cycloaliphatic, aromatic aliphatic, aromatic diisocyanate or a mixture of these, and which can then be reacted with a reagent including polyester-, polyether-, polycarbonate-, or polydiene-polyols, or aliphatic-, alicyclic-, or aromatic-diamines, or a mixture of these, and a dicyandiamide having the general formula:

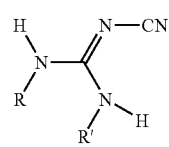

With reference to this general formula, R and R' independently are selected from hydrogen, —CH$_3$, —C$_2$H$_5$, —C$_6$H$_5$, —CH$_2$X, —C$_2$H$_4$X, —C$_6$H4X, —CH$_2$C$_6$H$_4$X, —CH$_2$CH$_2$C$_6$H$_4$X, or a mixture of these, where X is hydrogen, a methyl group, an ethyl group, a methoxy group, an ethoxy group, an amino group, a dimethylamino group, or a mixture of these.

In one particular embodiment, the invention concerns a multi-layer ball, such as a three-piece golf ball having a cover layer, a core and an intermediate layer. The cover layer includes the reaction product of either toluene diisocyanate, 4,4'-diphenylmethane diisocyanate, isophorone diisocyanate or any mixtures of these, with polytetramethylene ether glycol (PTMG), and a chain extender or curing agent, which includes a mixture of a dicyandiamide having the formula:

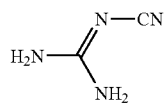

and a compound which can include either diethyl-2,4-toluenediamine; or 4,4"-methylenebis-(3-chloro,2,6-diethyl)-aniline; or 3,5-dimethylthio-2,4-toluenediamine; or 3,5-dimethylthio-2,6-toluenediamine; or a combination of the these. The core includes 1,2-polybutadiene, cis-1,4-polybutadiene, trans-1,4-polybutadiene, polyoctenamer, cis-polyisoprene, trans-polyisoprene, polychloroprene, polybutylene, or a combination of the these; and a cross-linking agent including diacetyl peroxide, di-tert-butyl peroxide, dibenzoyl peroxide, dicumyl peroxide, 2,5-dimethyl-2,5-di(benzoylperoxy)hexane, 1,4-bis-(tert-butylperoxyisopropyl)benzene, tert-butylperoxybenzoate, 2,5-dimethyl-2,5-di-(tert-butylperoxy)hexyne, 1,1-bis(tert-butylperoxy)-3,3,5-tri-methylcyclohexane, di-(2,4-dichlorobenzoyl)peroxide, 2,5-dimethyl-2,5-di(tert-butyl peroxy)hexane, 1,4-di-(2-tert-butyl peroxyisopropyl)benzene, tert-butyl perbenzoate, tert-butyl cumyl peroxide, or a mixture of these.

The core also typically includes from 0 to about 10 parts by weight (per 100 parts by weight of the core) of a peptizer. Suitable peptizers include 2,3,5,6-tetrachloro-4-pyridinethiol, pentachlorothiophenol, dibenzamido diphenyldisulfide, a metal salt of pentachlorothiophenol, an ammonium salt of pentachlorothiophenol, with the ammonium cation having the general formula [NR$^1$R$^2$R$^3$R$^4$]$^+$ where R$^1$, R$^2$, R$^3$, and R$^4$ is either hydrogen, or a C$_1$-C$_{20}$ aliphatic, cycloaliphatic or aromatic system, or a mixture of these. The core can also include 0 to about 20 parts by weight (per 100 parts by weight of the core) of a nanofiller. Suitable nanofillers can include either hydrotalcite, montmorillonite, phyllosilicate, saponite, hectorite, beidellite, stevensite, vermiculite, halloysite, mica, micafluoride, octosilicate, or a mixture of these. The balls intermediate layer can include one or more ionomers, including unimodal ionomers, bimodal ionomers, modified unimodal ionomers, modified bimodal ionomers, or a mixture of these; or one or more polyalkenamers; or an injection moldable composition comprising at least one polyalkenamer and at least about 10 parts by weight of at least one polyamide, based on the total polymer amount of the intermediate layer.

In another particular embodiment, the invention is a four-piece golf ball having a cover layer, a core, an inner intermediate layer, and an outer intermediate layer. For working embodiments, the cover layer includes the reaction product of either toluene diisocyanate, 4,4'-diphenylmethane diisocyanate, isophorone diisocyanate or any mixtures of these, with polytetramethylene ether glycol (PTMG), and a chain extender or curing agent, which includes a mixture of a dicyandiamide having the formula:

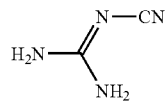

and a compound which can include either diethyl-2,4-toluenediamine; or 4,4"-methylenebis-(3-chloro,2,6-diethyl)-aniline; or 3,5-dimethylthio-2,4-toluenediamine; or 3,5-dimethylthio-2,6-toluenediamine; or a combination of the these. The core includes 1,2-polybutadiene, cis-1,4-polybutadiene, trans-1,4-polybutadiene, polyoctenamer, cis-polyisoprene, trans-polyisoprene, polychloroprene, polybutylene, or a combination of the these; and a cross-linking agent including diacetyl peroxide, di-tert-butyl peroxide, dibenzoyl peroxide, dicumyl peroxide, 2,5-dimethyl-2,5-di(benzoylperoxy)hexane, 1,4-bis-(tert-butylperoxyisopropyl)benzene, tert-butylperoxybenzoate, 2,5-dimethyl-2,5-di-(tert-butylperoxy)hexyne, 1,1-bis(tert-butylperoxy)-3,3,5-tri-methylcyclohexane, di-(2,4-dichlorobenzoyl)peroxide, 2,5-dimethyl-2,5-di(tert-butyl peroxy)hexane, 1,4-di-(2-tert-butyl peroxyisopropyl)benzene, tert-butyl perbenzoate, tert-butyl cumyl peroxide, or a mixture of these. The core also typically includes from 0 to about 10 parts by weight (per 100 parts by weight of the core) of a peptizer. Suitable peptizers include either 2,3,5,6-tetrachloro-4-pyridinethiol, pentachlorothiophenol, dibenzamido diphenyldisulfide, a metal salt of pentachlorothiophenol, an ammonium salt of pentachlorothiophenol with the ammonium cation having the general formula [NR$^1$R$^2$R$^3$R$^4$]$^+$ where R$^1$, R$^2$, R$^3$, and R$^4$ are either hydrogen, or a C$_1$-C$_{20}$ aliphatic, cycloaliphatic or aromatic system, or a mixture of these. The core can also include 0 to about 20 parts by weight (per 100 parts by weight of the core) of a nanofiller, which can include either hydrotalcite, montmorillonite, phyllosilicate, saponite, hectorite, beidellite, stevensite, vermiculite, halloysite, mica, micafluoride, octosilicate, or a mixture of these. The balls inner intermediate layer can include one or more ionomers, including the unimodal ionomers, bimodal ionomers, modified unimodal ionomers, modified bimodal ionomers, or a mixture of these, or a polyalkenamer, or a mixture of ionomer and polyalkenamer. The balls outer intermediate layer can include an injection moldable composition including at least one polyalkenamer and at least about 10 parts by weight of at least one polyamide, based on the total polymer amount of the intermediate layer.

In another particular embodiment, the invention is a four-piece golf ball having a cover layer, a core, an inner intermediate layer, and an outer intermediate layer. The cover layer typically includes the reaction product of either toluene diisocyanate, 4,4'-diphenylmethane diisocyanate, isophorone diisocyanate or any mixtures of these, with polytetramethylene ether glycol (PTMG), and a chain extender or curing agent, which includes a mixture of a dicyandiamide having the formula:

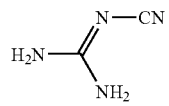

and diethyl-2,4-toluenediamine; or 4,4"-methylenebis-(3-chloro,2,6-diethyl)-aniline; or 3,5-dimethylthio-2,4-toluenediamine; or 3,5-dimethylthio-2,6-toluenediamine; or a combination of the these. The core includes 1,2-polybutadiene, cis-1,4-polybutadiene, trans-1,4-polybutadiene, polyoctenamer, cis-polyisoprene, trans-polyisoprene, polychloroprene, polybutylene, or a combination of the these; and a cross-linking agent including diacetyl peroxide, di-tert-butyl peroxide, dibenzoyl peroxide, dicumyl peroxide, 2,5-dimethyl-2,5-di(benzoylperoxy)hexane, 1,4-bis-(tert-butylperoxyisopropyl)benzene, tert-butylperoxybenzoate, 2,5-dimethyl-2,5-di-(tert-butylperoxy)hexyne, 1,1-bis(tert-butylperoxy)-3,3,5-tri-methylcyclohexane, di-(2,4-dichlorobenzoyl)peroxide, 2,5-dimethyl-2,5-di(tert-butyl peroxy)hexane, 1,4-di-(2-tert-butyl peroxyisopropyl)benzene, tert-butyl perbenzoate, tert-butyl cumyl peroxide, or a mixture of these. The core also includes from 0 to about 10 parts by weight (per 100 parts by weight of the core) of a peptizer. Suitable peptizers include 2,3,5,6-tetrachloro-4-pyridinethiol, pentachlorothiophenol, dibenzamido diphenyldisulfide, a metal salt of pentachlorothiophenol, an ammonium salt of pentachlorothiophenol with the ammonium cation having the general formula $[NR^1R^2R^3R^4]^+$ where $R^1, R^2, R^3$, and $R^4$ is either hydrogen, or a $C_1$-$C_{20}$ aliphatic, cycloaliphatic or aromatic system, or a mixture of these. The core can also include 0 to about 20 parts by weight (per 100 parts by weight of the core) of a nanofiller which can include either hydrotalcite, montmorillonite, phyllosilicate, saponite, hectorite, beidellite, stevensite, vermiculite, halloysite, mica, micafluoride, octosilicate, or a mixture of these. The balls inner intermediate layer can include an injection moldable composition including at least one polyalkenamer and at least about 10 parts by weight of at least one polyamide, based on the total polymer amount of the intermediate layer. The balls outer intermediate layer can include one or more ionomers, including the unimodal ionomers, bimodal ionomers, modified unimodal ionomers, modified bimodal ionomers, or a mixture of these, or a polyalkenamer, or a mixture of ionomer and polyalkenamer.

In another particular embodiment, the invention is a composition comprising the reaction product of one or more polyisocyanates; a reagent which is a polyol, a polyamine or a combination of the two, and a chain extender or curing agent including one or more dicyandiamides having the general formula:

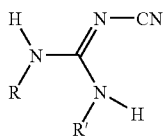

where R and R' independently are hydrogen, or a $C_1$-$C_{20}$ aliphatic, cycloaliphatic or aromatic moiety.

In another particular embodiment, the invention is a method of making a golf ball. The method includes a first step of providing a prepolymer which includes a diisocyanate and a reagent including a polyols, or a polyamines or a mixture of these. The second step involves providing a curative for use in casting, which includes a dicyandiamides having the general formula:

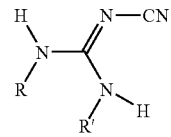

where R and R' independently are hydrogen, or a $C_1$-$C_{20}$ aliphatic, cycloaliphatic or aromatic moiety. The next step involves mixing the prepolymer with the curative in a mixer to create a polymer mixture wherein a pot life of approximately 55-70 seconds is formed. The mixture is then poured into a first mold half, and then poured into a second mold half. The next step involves lowering a golf ball core into the first mold half such that the golf ball is suspended in the polymer mixture. The first mold half is then inverted and mated to the second mold half. The mated first and second mold halves containing the polymer mixture and the golf ball core are then heated and then cooled. Finally the next step involves removing the molded golf ball from the first and second mold halves and allowing the golf ball to cure.

In another particular embodiment, the invention is a method for making a golf ball. The method includes the steps of positioning a spherical uncovered golf ball product in the center of a mold, the mold having a spherical mold surface, closing the mold around the golf ball product, mixing a polyurethane prepolymer and a curing agent to form a thermoset reaction mixture, for use in casting, wherein said curing agent comprises one or more dicyandiamides having the general formula:

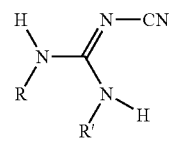

where R and R' independently are hydrogen, or a $C_1$-$C_{20}$ aliphatic, cycloaliphatic or aromatic moiety. This mixture is then reaction injection molded in the mold to form a golf ball cover layer over the golf ball product. The reaction mixture is then allowed to gel and form a golf ball, and the mold is opened and the golf ball removed.

DETAILED DESCRIPTION

Figure 1:
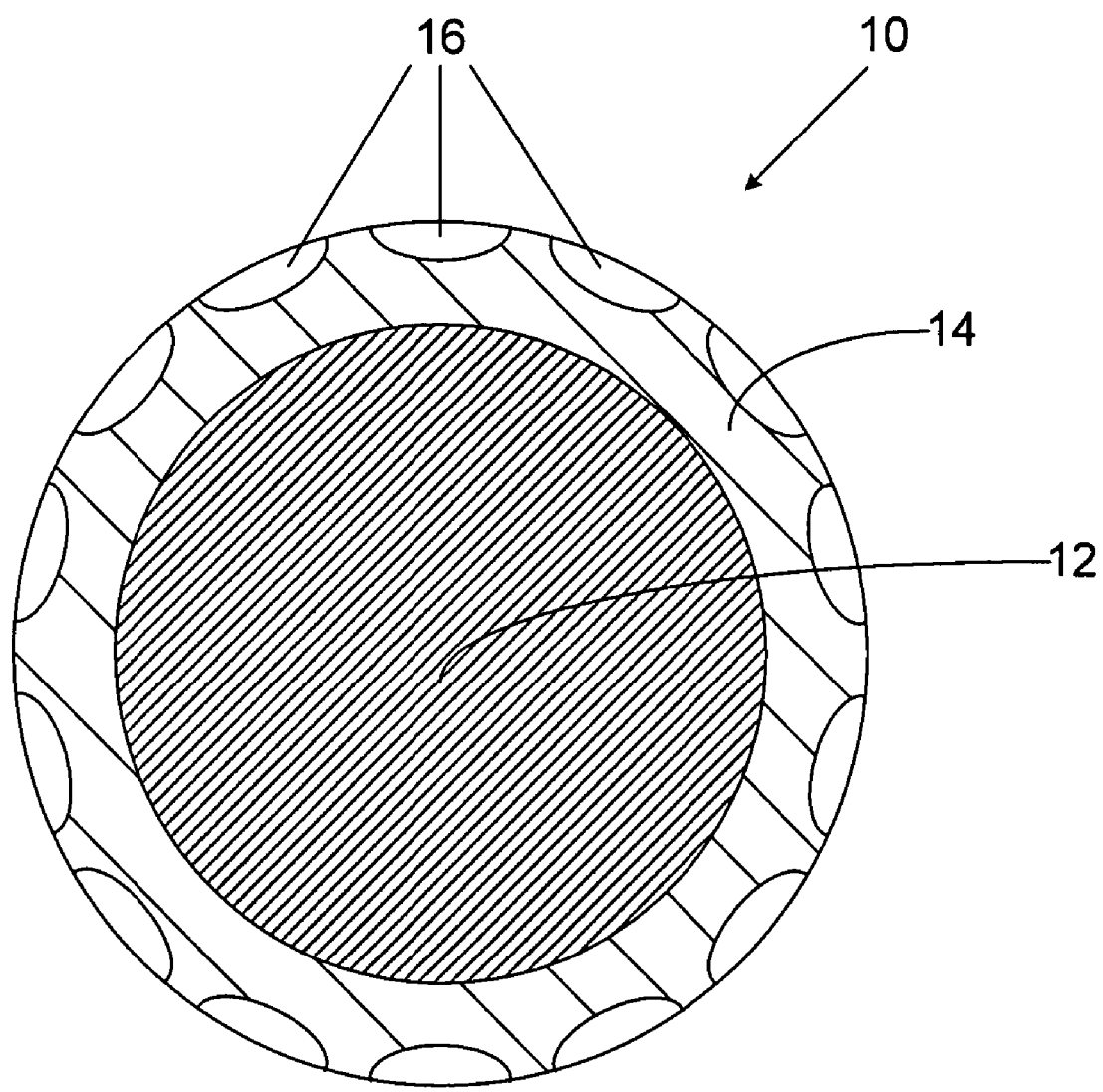
FIG. 1 illustrates a two-piece golf ball 10 comprising a solid center or core 12, and an outer cover layer 14. Golf balls also typically include plural dimples 16 formed in the outer cover and arranged in various desired patterns.

The following definitions are provided to aid the reader, and are not intended to provide term definitions that would be narrower than would be understood by a person of ordinary skill in the art of golf ball composition and manufacture.

Any numerical values recited herein include all values from the lower value to the upper value. All possible combinations of numerical values between the lowest value and the highest value enumerated herein are expressly included in this application.

The terms "aryl" and "heteroaryl" as used herein refer to any aryl group, which optionally can be substituted, or any "heteroaryl" group, which also optionally can be substituted, and includes, by way of example and without limitation, phenyl, biphenyl, indenyl, naphthyl (1-naphthyl, 2-naphthyl), N-hydroxytetrazolyl, N-hydroxytriazolyl, N-hydroxyimidazolyl, anthracenyl (1-anthracenyl, 2-anthracenyl, 3-anthracenyl), thiophenyl (2-thienyl, 3-thienyl), furyl (4-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl (2-pyrrolyl), pyrazolyl (3-pyrazolyl), imidazolyl (1-imidazolyl, 2-imidazolyl, 4-imidazolyl, 5-imidazolyl), triazolyl (1,2,3-triazol-1-yl, 1,2,3-triazol-2-yl 1,2,3-triazol-4-yl, 1,2,4-triazol-3-yl), oxazolyl (2-oxazolyl, 4-oxazolyl, 5-oxazolyl), thiazolyl (2-thiazolyl, 4-thiazolyl, 5-thiazolyl), pyridyl (2-pyridyl, 3-pyridyl, 4-pyridyl), pyrimidinyl (2-pyrimidinyl, 4-pyrimidinyl, 5-pyrimidinyl, 6-pyrimidinyl), pyrazinyl, pyridazinyl (3-pyridazinyl, 4-pyridazinyl, 5-pyridazinyl), quinolyl (2-quinolyl, 3-quinolyl, 4-quinolyl, 5-quinolyl, 6-quinolyl, 7-quinolyl, 8-quinolyl), isoquinolyl (1-isoquinolyl, 3-isoquinolyl, 4-isoquinolyl, 5-isoquinolyl, 6-isoquinolyl, 7-isoquinolyl, 8-isoquinolyl), benzo[b]furanyl (2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl (2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl (2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl, 5-(2,3-dihydro-benzo[b]thiophenyl), 6-(2,3-dihydro-benzo[b]thiophenyl), 7-(2,3-dihydro-benzo[b]thiophenyl), indolyl (1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl (1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl (1-benzoxazolyl, 2-benzoxazolyl), benzothiazolyl (1-benzothiazolyl, 2-benzothiazolyl, 4-benzothiazolyl, 5-benzothiazolyl, 6-benzothiazolyl, 7-benzothiazolyl), carbazolyl (1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl, 10,11-dihydro-5H-dibenz[b,f]azepine (10,11-dihydro-5H-dibenz[b,f]azepine-1-yl, 10,11-dihydro-5H-dibenz[b,f]azepine-2-yl.

The term "bimodal polymer" refers to a polymer comprising two main fractions and more specifically to the form of the polymer's molecular weight distribution curve, i.e., the appearance of the graph of the polymer weight fraction as a function of its molecular weight. When the molecular weight distribution curves from these fractions are superimposed onto the molecular weight distribution curve for the total resulting polymer product, that curve will show two maxima or at least be distinctly broadened in comparison with the curves for the individual fractions. Such a polymer product is called bimodal. The chemical compositions of the two fractions may be different.

The term "chain extender" as used herein is a compound added to either a polyurethane or polyurea prepolymer, (or the prepolymer starting materials), which undergoes additional reaction but at a level sufficiently low to maintain the thermoplastic properties of the final composition.

The term "conjugated" refers to an organic compound containing two or more sites of unsaturation (e.g., carbon-carbon double bonds, carbon-carbon triple bonds, and sites of unsaturation comprising atoms other than carbon, such as nitrogen) separated by a single bond.

The term "curing agent" or "curing system" as used interchangeably herein is a compound added to either polyurethane or polyurea prepolymer, (or the prepolymer starting materials), which imparts additional crosslinking to the final composition to render it a thermoset.

As used herein, the term "core" is intended to mean the elastic center of a golf ball, which may have a unitary construction. Alternatively the core itself may have a layered construction, e.g. having a spherical "center" and additional "core layers," with such layers being made of the same material or a different material from the core center.

The term "cover" is meant to include any layer of a golf ball that surrounds the core. Thus a golf ball cover may include both the outermost layer and also any intermediate layers, which are disposed between the golf ball center and outer cover layer. "Cover" may be used interchangeably with the term "cover layer".

The term "delta E*ab" as used herein means the total color difference between an untreated sample and a treated sample as calculated by taking the Euclidean distance of the two in the L*a*b* space, where L is lightness, a is the green to red indicator and b the blue to yellow indicator.

A "fiber" is a general term and the definition provided by Engineered Materials Handbook, Vol. 2, "Engineering Plastics," published by A.S.M. International, Metals Park, Ohio, USA, is relied upon to refer to filamentary materials with a finite length that is at least 100 times its diameter, which typically is 0.10 to 0.13 mm (0.004 to 0.005 inches.). Fibers can be continuous or specific short lengths (discontinuous), normally no less than 3.2 mm (⅛ inch.). Although fibers according to this definition are preferred, fiber segments, i.e., parts of fibers having lengths less than the aforementioned also may be used in the present invention. Embodiments of the golf ball components described herein may include fibers including, by way of example and without limitation, glass fibers, such as E fibers, Cem-Fil filament fibers, and 204 filament strand fibers; carbon fibers, such as graphite fibers, high modulus carbon fibers, and high strength carbon fibers; asbestos fibers, such as chrysotile and crocidolite; cellulose fibers; aramid fibers, such as Kevlar, including types PRD 29 and PRD 49; and metallic fibers, such as copper, high tensile steel, and stainless steel. In addition, single crystal fibers, potassium titanate fibers, calcium sulphate fibers, and fibers or filaments of one or more linear synthetic polymers, such as Terylene, Dacron, Perlon, Orion, Nylon, including Nylon type 242, are contemplated. Polypropylene fibers, including monofilament and fibrillated fibers are also contemplated. Golf balls according to the present invention also can include any combination of such fibers. Fibers used in golf ball components are described more fully in Kim et al. U.S. Pat. No. 6,012,991, which is incorporated herein by reference.

In the case of a ball with two intermediate layers, the term "inner intermediate layer" may be used interchangeably herein with the terms "inner mantle" or "inner mantle layer" and is intended to mean the intermediate layer of the ball positioned nearest to the core.

The term "intermediate layer" may be used interchangeably with "mantle layer," "inner cover layer" or "inner cover" and is intended to mean any layer(s) in a golf ball disposed between the core and the outer cover layer.

The term "(meth)acrylate" is intended to mean an ester of methacrylic acid and/or acrylic acid.

The term "(meth)acrylic acid copolymers" is intended to mean copolymers of methacrylic acid and/or acrylic acid.

By the term "reduced-yellowing" as used to describe the polymer compositions of the present invention, is intended to mean a polyurethane or polyurea which, absent the addition of any UV inhibitors, and when exposed to UV-A light using a QUV weathering tester from Q-Panel at a wavelength of 315400 nm, for 360 minutes at a temperature of 45° C. and an exposure level of 0.83 W/m$^2$/nm at 45° C. has dEab measurements on a Minolta spectrophotometer CM-3500d of less than 30, preferably less than 20, even more preferably less than 10.

A "nanofiller" is defined as a material having an aggregate structure with the aggregate particle sizes in the micron range and above. However, these aggregates have a stacked plate structure with the individual platelets being roughly from about 1 nanometer (nm) thick and from about 100 to about 1000 nm across. As a result, nanofillers have extremely high surface area, resulting in high reinforcement efficiency to the material at low loading levels of the particles. Typically such sub-micron-sized particles enhance the stiffness of the material, without increasing its weight or opacity and without reducing the material's low-temperature toughness. Inorganic nanofiller materials generally are made from clay, and to facilitate incorporation of the nanofiller material into the polymer material, either in preparing nanocomposite materials or in preparing polymer-based golf ball compositions, the clay particles generally are coated or treated by a suitable compatibilizing agent or coupling agent.

A "nanocomposite" is defined as a polymer matrix having nanofiller within the matrix. Nanocomposite materials and golf balls made comprising nanocomposite materials are disclosed in Kim et al., U.S. Pat. No. 6,794,447, and U.S. Patent Publication No. 2005/0059756 A1, as well as U.S. Pat. Nos. 5,962,553 to Ellsworth, 5,385,776 to Maxfield et al., and 4,894,411 to Okada et al., the disclosures of which are incorporated herein by reference in their entirety. Examples of nanocomposite materials currently marketed include M1030D, manufactured by Unitika Limited, of Osaka, Japan, and 1015C2, manufactured by UBE America of New York, N.Y.

The term "outer cover layer" is intended to mean the outermost cover layer of the golf ball on which, for example, the dimple pattern, paint and any writing, symbol, etc. is placed. If, in addition to the core, a golf ball comprises two or more cover layers, only the outermost layer is designated the outer cover layer. The remaining layers may be designated intermediate layers. The term outer cover layer is interchangeable with the term "outer cover".

In the case of a ball with two intermediate layers, the term "outer intermediate layer" may be used interchangeably herein with the terms "outer mantle" or "outer mantle layer" and is intended to mean the intermediate layer of the ball which is disposed nearest to the outer cover layer.

"Peptizers" are chemical(s) or compositions that have been used by rubber compounders to facilitate the processing of natural or synthetic rubbers and other difficult-to-process high viscosity elastomers during milling and mastication.

The term "polyalkenamer" is used interchangeably herein with the term "polyalkenamer rubber" and means a polymer of one or more alkenes, including cycloalkenes, having from 5-20, preferably 5-15, most preferably 5-12 ring carbon atoms. The polyalkenamers may be prepared by any suitable method including ring opening metathesis polymerization of one or more cycloalkenes in the presence of organometallic catalysts as described in U.S. Pat. Nos. 3,492,245, and 3,804,803, the entire contents of both of which are incorporated herein by reference.

"Prepolymer" refers to any material that can be further processed to form a final polymer material of a manufactured golf ball, such as, by way of example and not limitation, a polymerized or partially polymerized material that can undergo additional processing, such as crosslinking.

The term "polyurea" as used herein refers to materials prepared by reaction of a diisocyanate with a polyamine.

The term "polyurethane" as used herein refers to materials prepared by reaction of a diisocyanate with a polyol.

A "thermoplastic" is generally defined as a material that is capable of softening or melting when heated and of hardening again when cooled. Thermoplastic polymer chains often are not cross-linked or are lightly crosslinked using a chain extender, but the term "thermoplastic" as used herein may refer to materials that initially act as thermoplastics, such as during an initial extrusion process or injection molding process, but which also may be crosslinked, such as during a compression molding step to form a final structure.

A "thermoset" is generally defined as a material that crosslinks or cures via interaction with as crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" refers to a material prepared by reaction of a prepared by reaction of a diisocyanate with a polyol, and optionally addition of a chain extender.

The term "thermoplastic polyurea" refers to a material prepared by reaction of a prepared by reaction of a diisocyanate with a polyamine, with optionally addition of a chain extender.

The term "thermoset polyurethane" refers to a material prepared by reaction of a diisocyanate with a polyol, and a curing agent.

The term "thermoset polyurea" refers to a material prepared by reaction of a diisocyanate with a polyamine, and a curing agent.

A "urethane prepolymer" is the reaction product of diisocyanate and a polyol.

A "urea prepolymer" is the reaction product of a diisocyanate and a polyamine.

The term "unimodal polymer" refers to a polymer comprising one main fraction and more specifically to the form of the polymer's molecular weight distribution curve, i.e., the molecular weight distribution curve for the total polymer product shows only a single maximum.

Figure 2:
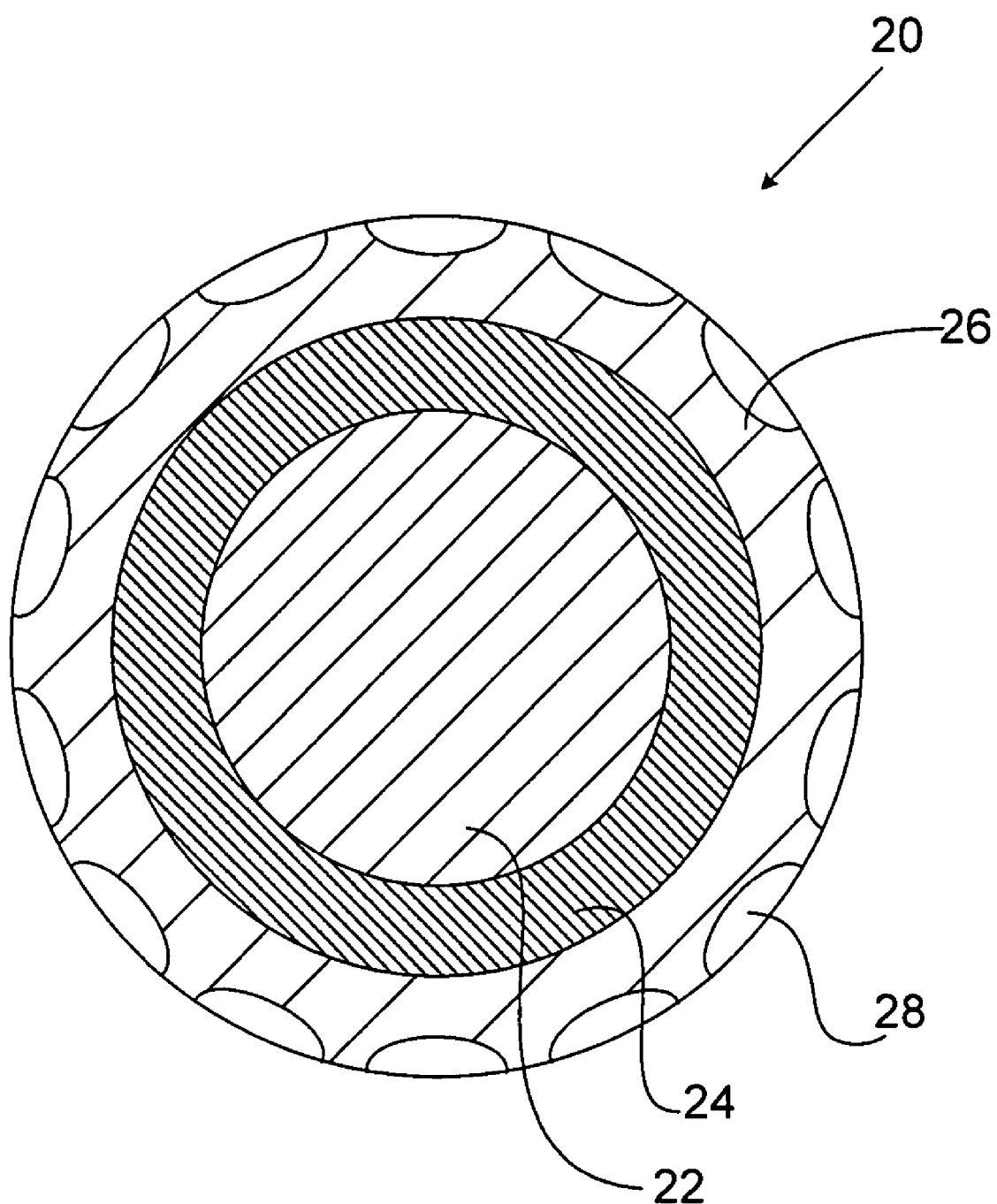
FIG. 2 illustrates a 3-piece golf ball 20 comprising a core 22, an intermediate layer 24 and an outer cover layer 26. Golf ball 20 also typically includes plural dimples 28 formed in the outer cover layer 26 and arranged in various desired patterns.

Although FIGS. 1 and 2 illustrate only two- and three-piece golf ball constructions, golf balls of the present invention may comprise from 0 to at least 5 intermediate layer(s), preferably from 0 to 3 intermediate layer(s), more preferably from 1 to 3 intermediate layer(s), and most preferably 1 to 2 intermediate layer(s).

The present invention can be used to form golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.670 inches to about 1.800 inches. Oversize golf balls with diameters above about 1.760 inches to as big as 2.75 inches also are within the scope of the invention.

The reduced-yellowing polymer composition of the present invention is prepared by combining a diisocyanate with either a polyamine or polyol or a mixture thereof and one or more dicyandiamides. In a preferred embodiment the dicyandiamide is combined with a urethane or urea prepolymer to form the reduced-yellowing polymer composition.

The dicyandiamide may be used alone as a chain extender or curing agent or may be used in combination with other chain extenders and curing agents to control reaction times and final properties of the reduced-yellowing polymer composition. The final composition advantageously may be employed as an intermediate layer in a golf ball and even more advantageously as an outer cover layer.

Any isocyanate available to one of ordinary skill in the art is suitable for use according to the invention. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R preferably is a cyclic, aromatic, or linear or branched hydrocarbon moiety containing from about 1 to about 50 carbon atoms. The isocyanate also may contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4"-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

In view of the aforementioned advantages of injection molding versus the more complex casting process, under some circumstances it is advantageous to have formulations capable of curing as a thermoset but only within a specified temperature range above that of the typical injection molding process. This allows parts, such as golf ball cover layers, to be initially injection molded, followed by subsequent processing at higher temperatures and pressures to induce further crosslinking and curing, resulting in thermoset properties in the final part. Such an initially injection moldable composition is thus called a post curable urethane or urea composition.

If a post curable reduced-yellowing urethane composition is required, a modified or blocked diisocyanate which subsequently unblocks and induces further cross linking post extrusion may be included in the diisocyanate starting material. Modified isocyanates used for making the polyurethanes of the present invention generally are defined as chemical compounds containing isocyanate groups that are not reactive at room temperature, but that become reactive once they reach a characteristic temperature. The resulting isocyanates can act as crosslinking agents or chain extenders to form crosslinked polyurethanes. The degree of crosslinking is governed by type and concentration of modified isocyanate presented in the composition. The modified isocyanate used in the composition preferably is selected, in part, to have a characteristic temperature sufficiently high such that the urethane in the composition will retain its thermoplastic behavior during initial processing (such as injection molding). If a characteristic temperature is too low, the composition crosslinks before processing is completed, leading to process difficulties. The modified isocyanate preferably is selected from isophorone diisocyanate (IPDI)-based uretdione-type crosslinker; a combination of a uretdione adduct of IPDI and a partially e-caprolactam-modified IPDI; a combination of isocyanate adducts modified by e-caprolactam and a carboxylic acid functional group; a caprolactam-modified Desmodur diisocyanate; a Desmodur diisocyanate having a 3,5-dimethylpyrazole modified isocyanate; or mixtures of these. Particular preferred examples of modified isocyanates include those marketed under the trade name CRELAN by Bayer Corporation. Examples of these include: CRELAN TP LS 2147; CRELAN NI 2; isophorone diisocyanate (IPDI)-based uretdione-type crosslinker, such as CRELAN VP LS 2347; a combination of a uretdione adduct of IPDI and a partially e-caprolactam-modified IPDI, such as CRELAN VP LS 2386; a combination of isocyanate adducts modified by e-caprolactam and a carboxylic acid functional group, such as CRELAN VP LS 2181/1; a caprolactam-modified Desmodur diisocyanate, such as CRELAN NW5; and a Desmodur diisocyanate having a 3,5-dimethylpyrazole modified isocyanate, such as CRELAN XP 7180. These modified isocyanates may be used either alone or in combination. Such modified diisocyanates are described in more detail in U.S. Pat. No. 6,939,924, the entire contents of which are hereby incorporated by reference.

As an alternative if a post curable reduced-yellowing polyurethane or polyurea composition is required, the diisocyanate may further comprise reaction product of a nitroso compound and a diisocyanate or a polyisocyanate. The reaction product has a characteristic temperature at which it decomposes regenerating the nitroso compound and diisocyanate or polyisocyanate, which can, by judicious choice of the post processing temperature, in turn induce further crosslinking in the originally thermoplastic composition resulting in thermoset-like properties. Such nitroso compounds are described in more detail in U.S. Pat. No. 7,037,985 B2, the entire contents of which are hereby incorporated by reference.

Any polyol now known or hereafter developed is suitable for use according to the invention. Polyols suitable for use in the reduced-yellowing compositions of the present invention include, but are not limited to, polyester polyols, polyether polyols, polycarbonate polyols and polydiene polyols such as polybutadiene polyols.

Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of $\epsilon$-caprolactone, and polyol obtained by opening the ring of $\beta$-methyl-$\delta$-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, $\epsilon$-caprolactone, and $\beta$-methyl-$\delta$-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. The polyether polyol may be used either alone or in a combination.

Polycarbonate polyol is obtained by the condensation of a known polyol (polyhydric alcohol) with phosgene, chloroformic acid ester, dialkyl carbonate or diallyl carbonate. Particularly preferred polycarbonate polyols contain a polyol component using 1,6-hexanediol, 1,4-butanediol, 1,3-butanediol, neopentylglycol or 1,5-pentanediol. Polycarbonate polyols can be used either alone or in a combination with other polyols.

Polydiene polyols include liquid diene polymer containing hydroxyl groups having an average of at least 1.7 functional groups, and may comprise diene polymers or diene copolymers having from about 4 to about 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

Polybutadiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant Any polyamine available to one of ordinary skill in the polyurethane art is suitable for use according to the invention. Polyamines suitable for use in the reduced-yellowing compositions of the present invention include, but are not limited to, amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof.

Diisocyanate and polyol or polyamine components may be combined to form a prepolymer prior to reaction with a chain extender or curing agent. Any such prepolymer combination is suitable for use in the present invention. Commercially available prepolymers include LFH580, LFH120, LFH710, LFH1570, LF930A, LF950A, LF601D, LF751D, LFG963A, LFG640D.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

In one embodiment, the number of free NCO groups in the urethane or urea prepolymer may be less than about 14 percent. Preferably the urethane or urea prepolymer has from about 3 percent to about 11 percent, more preferably from about 4 to about 9.5 percent, and even more preferably from about 3 percent to about 9 percent, free NCO on an equivalent weight basis.

The dicyandiamides used in the present invention have the general formula:

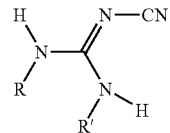

where R and R' independently are hydrogen, or a $C_1$-$C_{20}$ aliphatic, cycloaliphatic or aromatic moiety or substituted aliphatic, cycloaliphatic or aromatic moiety. For example R may be H, —$CH_3$, —$C_2H_5$, —$C_6H_5$, —$CH_2X$, —$C_2H_4X$, —$C_6H_4X$, —$CH_2C_6H_4X$, —$CH_2CH_2C_6H_4X$, or any and all combinations thereof, and where X may be hydrogen, a methyl group, an ethyl group, a methoxy group, an ethoxy group, an amino group and a dimethylamino group or any and all combinations thereof.

Dicyandiamide may be commercially acquired from Degussa AG under the trade name Dyhard®. Dicyandiamide is added to the isocyanate-containing composition in an effective amount. Currently, an effective amount is up to at least 15 phr, preferably from about 0.1 to about 10 phr and, more preferably, from about 0.3 to about 6 phr. relative to the weight of the final polyurethane or polyurea.

The dicyandiamide may be combined with a second compound to vary properties such as solubility, cross-linking reactivity and/or curing temperature. Such compounds include, but are not limited to, guanidines, including aliphatic, cycloaliphatic, aromatic guanidines, including but not limited to alkyl- and polyalkyl-guanidines; aldehydes, such as formaldehyde; amine terminated polyethers; aliphatic, alicyclic and/or aromatic diamines, including but not limited to, tetramethylenediamine, pentamethylenediamine, hexamethylenediamine, 3,3'-dimethyl-4,4'-diamino-dicyclohexyl methane, 4,4'-methylene bis-2-chloroaniline, 2,2',3,3'-tetrachloro-4,4'-diaminophenyl methane, p,p'-methylenedianiline, p-phenylenediamine, 4,4'-diaminodiphenyl, 2,4,6-tris(dimethylaminomethyl)phenol; or any and all combinations thereof.

The dicyandiamide chain extender or curing agent of the present invention may be used alone or in combination with the wide variety of other chain extenders or curing agents previously used to produce the respective thermoplastic or thermoset polyurethanes or polyureas.

Polyol chain extenders or curing agents may be primary, secondary, or tertiary polyols. Non-limiting examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Diamines and other suitable polyamines may be added to the compositions of the present invention to function as chain extenders or curing agents. These include primary, secondary and tertiary amines having two or more amines as functional groups. Exemplary diamines include aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as diethyl-2,4-toluenediamine, 4,4"-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, 4,4'-methylene bis-2-chloroaniline, 2,2',3,3'-tetrachloro-4,4'-diamino-phenyl methane, p,p'-methylenedianiline, p-phenylenediamine or 4,4'-diaminodiphenyl; and 2,4,6-tris(dimethylaminomethyl) phenol.

Further examples include ethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-(bis-propylamine); monoethanolamine, diethanolamine; triethanolamine; monoisopropanolamine, diisopropanolamine; isophoronediamine; and mixtures thereof.

Aromatic diamines have a tendency to provide a stiffer (i.e., having a higher Mooney viscosity) product than aliphatic or cycloaliphatic diamines.

Depending on their chemical structure, curing agents may be slow- or fast-reacting polyamines or polyols. As described in U.S. Pat. Nos. 6,793,864, 6,719,646 and copending U.S. Patent Publication No. 2004/0201133 A1, (the contents of all of which are hereby incorporated herein by reference), slow-reacting polyamines are diamines having amine groups that are sterically and/or electronically hindered by electron withdrawing groups or bulky groups situated proximate to the amine reaction sites. The spacing of the amine reaction sites will also affect the reactivity speed of the polyamines.

Suitable curatives for use in the present invention are selected from the slow-reacting polyamine group include, but are not limited to, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, and mixtures thereof. Of these, 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP.

When slow-reacting polyamines are used as the curing agent to produce urethane elastomers, a catalyst is typically needed to promote the reaction between the urethane prepolymer and the curing agent. Specific suitable catalysts include TEDA (1) dissolved in di-propylene glycol (such as TEDA L33 available from Witco Corp. Greenwich, Conn., and DABCO 33 LV available from Air Products and Chemicals Inc.). Catalysts are added at suitable effective amounts, such as from about 2% to about 5%, and (2) more preferably TEDA dissolved in 1,4-butane diol from about 2% to about 5%. Another suitable catalyst includes a blend of 0.5% 33LV or TEDA L33 (above) with 0.1% dibutyl tin dilaurate (available from Witco Corp. or Air Products and Chemicals, Inc.) which is added to a curative such as VIBRACURE® A250. Unfortunately, as is well known in the art, the use of a catalyst can have a significant effect on the ability to control the reaction and thus, on the overall processability.

To eliminate the need for a catalyst, a fast-reacting curing agent, or agents, can be used that does not have electron withdrawing groups or bulky groups that interfere with the reaction groups. However, the problem with lack of control associated with the use of catalysts is not completely eliminated since fast-reacting curing agents also are relatively difficult to control.

In one embodiment of the present invention the dicyandiamide may be used in a blend with either a slower or faster curing agent to eliminate the problems associated with using either type of curing agent in isolation. The ultimate result of such a combination is greater control and concomitant flexibility over the reactions used to produce the polyurethanes or polyureas. Preferably the dicyandiamide is used in combination with a faster curing agent.

In accordance with the present invention, preferred curing agent blends include using dicyandiamide in combination with fast curing agents such as diethyl-2,4-toluenediamine, 4,4"-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine and Curalon L, a trade name for a mixture of aromatic diamines sold by Uniroyal, Inc. or any and all combinations thereof. A preferred fast-reacting curing agent is diethyl-2,4-toluene diamine, which has two commercial grades names, Ethacure® 100 and Ethacure® 100LC commercial grade has lower color and less by-product. In other words, it is considered a cleaner product to those skilled in the art.

An especially preferred blend is a mixture comprising from about 1 to about 40, more preferably from about 2 to about 30, even more preferably from about 3 to about 20 weight percent dicyandiamide. The balance is diethyl-2,4-toluenediamine (based on the final weight of the curative mixture).

Advantageously, the use of the Ethacure® 100LC commercial grade in combination with the dicyandiamide results in a golf ball that is less susceptible to yellowing when exposed to UV light conditions. A player appreciates this desirable aesthetic effect although it should be noted that the instant invention may use either of these two commercial grades for the curing agent diethyl-2,4-toluenediamine.

If a reduced-yellowing post curable composition is required the chain extender or curing agent can further comprise a peroxide or peroxide mixture. Before the composition is exposed to sufficient thermal energy to reach the activation temperature of the peroxide, the composition of (a) and (b) behaves as a thermoplastic material. Therefore, it can readily be formed into golf ball layers using injection molding. However, when sufficient thermal energy is applied to bring the composition above the peroxide activation temperature, crosslinking occurs, and the thermoplastic polyurethane is converted into crosslinked polyurethane.

Examples of suitable peroxides for use in compositions within the scope of the present invention include aliphatic peroxides, aromatic peroxides, cyclic peroxides, or mixtures of these. Primary, secondary, or tertiary peroxides can be used, with tertiary peroxides most preferred. Also, peroxides containing more than one peroxy group can be used, such as 2,5-bis-(tert-butylperoxy)-2,5-dimethyl hexane and 1,4-bis-(tert-butylperoxy-isopropyl)-benzene. Also, peroxides that are either symmetrical or asymmetric can be used, such as tert-butylperbenzoate and tert-butylcumylperoxide. Additionally, peroxides having carboxy groups also can be used. Decomposition of peroxides used in compositions within the scope of the present invention can be brought about by applying thermal energy, shear, reactions with other chemical ingredients, or a combination of these. Homolytically decomposed peroxide, heterolytically decomposed peroxide, or a mixture of those can be used to promote crosslinking reactions in compositions within the scope of this invention. Examples of suitable aliphatic peroxides and aromatic peroxides include diacetylperoxide, di-tert-butylperoxide, dibenzoylperoxide, dicumylperoxide, 2,5-bis-(t-butylperoxy)-2,5-dimethyl hexane, 2,5-dimethyl-2,5-di(benzoylperoxy)hexane, 2,5-dimethyl-2,5-di(butylperoxy)-3-hexyne, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl). Peroxides for use within the scope of this invention may be acquired from Akzo Nobel Polymer Chemicals of Chicago, Ill., Atofina of Philadelphia, Pa. and Akrochem of Akron, Ohio. Further details of this post curable system are disclosed in U.S. Pat. No. 6,924,337, the entire contents of which are hereby incorporated by reference.

Polymeric materials generally considered useful for making golf balls according to the process of the present invention also may be included in the components of the golf balls of the present invention and these include, without limitation, synthetic and natural rubbers, thermoset polymers such as other thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes or any and all combinations thereof.

More specific examples of particular polymeric materials useful for making golf ball cores, optional intermediate layer(s) and outer covers, again without limitation, are provided below.

Examples of olefinic thermoplastic elastomers include, without limitation, metallocene-catalyzed polyolefins, ethylene-octene copolymers, ethylene-butene copolymers, and ethylene-propylene copolymers all with or without controlled tacticity as well as blends of polyolefins having ethyl-propylene-non-conjugated diene terpolymers, rubber-based copolymers, and dynamically vulcanized rubber-based copolymers. Examples of such polymers that are commercially available include products sold under the trade names SANTOPRENE, DYTRON, VISTAFLEX, and VYRAM by Advanced Elastomeric Systems of Houston, Tex., and SARLINK by DSM of Haarlen, the Netherlands.

Examples of copolyester thermoplastic elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having from about 2 to about 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having from about 2 to about 10 carbon atoms with at least one diol component, selected from aliphatic and alicyclic diols having from about 2 to about 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals of Seoul, South Korea.

Examples of other thermoplastic elastomers include multi-block, rubber-based copolymers, particularly those in which the rubber block component is based on butadiene, isoprene, or ethylene/butylene. The non-rubber repeating units of the copolymer may be derived from any suitable monomer, including meth(acrylate) esters, such as methyl methacrylate and cyclohexylmethacrylate, and vinyl arylenes, such as styrene. Styrenic block copolymers are copolymers of styrene with butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al., which is incorporated herein by reference. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block. Examples of styrenic copolymers include, without limitation, resins manufactured by Kraton Polymers (formerly of Shell Chemicals) under the trade names KRATON D (for styrene-butadiene-styrene and styrene-isoprene-styrene types), and KRATON G (for styrene-ethylene-butylene-styrene and styrene-ethylene-propylene-styrene types) and Kuraray under the trade name SEPTON. Examples of randomly distributed styrenic polymers include paramethylstyrene-isobutylene (isobutene) copolymers developed by ExxonMobil Chemical Corporation and styrene-butadiene random copolymers developed by Chevron Phillips Chemical Corporation.

Examples of other thermoplastic elastomers suitable as additional polymer components in the present invention include those having functional groups, such as carboxylic acid, maleic anhydride, glycidyl, norbonene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trade name SEPTON HG-252 by Kuraray Company of Kurashiki, Japan. Other examples of these include: maleic anhydride functionalized triblock copolymer consisting of polystyrene end blocks and poly(ethylene/butylene), sold under the trade name KRATON FG 1901× by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; brominated styrene-isobutylene copolymers sold under the trade name BROMO XP-50 by Exxon Mobil Corporation; and resins having glycidyl or maleic anhydride functional groups sold under the trade name LOTADER by Elf Atochem of Puteaux, France.

In addition to the reduced-yellowing urethane composition of the present invention, the outer cover and/or one or intermediate layers of the golf ball may comprise one or more ionomer resins. One family of such resins was developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having from about 3 to about 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers can be ionomer resins with acrylic or methacrylic acid units present from 16 weight percent to about 35 weight percent in the polymer. Generally, such a high acid ionomer will have a flexural modulus from about 50,000 psi to about 125,000 psi.

Ionomer resins further comprising a softening comonomer, present from about 10 weight percent to about 50 weight percent in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth)acrylic acid and (meth)acrylate that can be used to make a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ $\alpha,\beta$ ethylenically unsaturated carboxylic acid, such as acrylic or methacrylic acid, and is present in an amount from about 2 to about 30 weight percent of the E/X/Y copolymer, and Y is a softening comonomer selected from the group consisting of alkyl acrylate and alkyl methacrylate, such as methyl acrylate or methyl methacrylate, and wherein the alkyl groups have from about 1 to about 8 carbon atoms, Y is in the range of 0 to about 50 weight percent of the E/X/Y copolymer, and wherein the acid groups present in said ionomeric polymer are partially neutralized with a metal selected from the group consisting of lithium, sodium, potassium, magnesium, calcium, barium, lead, tin, zinc or aluminum, and combinations thereof.

E/X/Y, where E is ethylene, X is a softening comonomer such as present in an amount of from 0 weight percent to about 50 weight percent of the polymer, and Y is present in an amount from about 5 weight percent to about 35 weight percent of the polymer, and wherein the acid moiety is neutralized from about 1% to about 100% to form an ionomer with a cation such as lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising a) a high molecular weight component having molecular weight of about 80,000 to about 500,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and b) a low molecular weight component having a molecular weight of about from about 2,000 to about 30,000 and comprising one or more ethylene/$\alpha$, $\beta$-ethylenically unsaturated $C_{3-8}$ carboxylic acid copolymers and/or one or more ethylene, alkyl(meth)acrylate, (meth)acrylic acid terpolymers; said low molecular weight component being partially neutralized with metal ions selected from the group consisting of lithium, sodium, potassium, magnesium, calcium, barium, lead, tin, zinc or aluminum, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers may be prepared by mixing:

a) an ionomeric polymer comprising ethylene, from about 5 to about 25 weight percent (meth)acrylic acid, and from 0 to about 40 weight percent of a (meth)acrylate monomer, said ionomeric polymer neutralized with metal ions selected from the group consisting of lithium, sodium, potassium, magnesium, calcium, barium, lead, tin, zinc or aluminum, or any and all mixtures thereof; and b) from about 5 to about 40 weight percent (based on the total weight of said modified ionomeric polymer) of one or more fatty acids or metal salts of said fatty acid, the metal being selected from lithium, sodium, potassium, magnesium, calcium, barium, lead, tin, zinc or aluminum, or any and all mixtures thereof; and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing:

a) a high molecular weight component having molecular weight of from about 80,000 to about 500,000 and comprising one or more ethylene/α, β-ethylenically unsaturated $C_{3-8}$ carboxylic acid copolymers and/or one or more ethylene, alkyl(meth)acrylate, (meth)acrylic acid terpolymers; said high molecular weight component being partially neutralized with metal ions selected from lithium, sodium, potassium, magnesium, calcium, barium, lead, tin, zinc or aluminum, or any and all mixtures thereof; and b) a low molecular weight component having a molecular weight of about from about 2,000 to about 30,000 and comprising one or more ethylene/α, β-ethylenically unsaturated $C_{3-8}$ carboxylic acid copolymers and/or one or more ethylene, alkyl(meth)acrylate, (meth)acrylic acid terpolymers; said low molecular weight component being partially neutralized with metal ions selected from lithium, sodium, potassium, magnesium, calcium, barium, lead, tin, zinc or aluminum, or any and all mixtures thereof; and c) from about 5 to about 40 weight percent (based on the total weight of said modified ionomeric polymer) of one or more fatty acids or metal salts of said fatty acid, the metal being selected from lithium, sodium, potassium, magnesium, calcium, barium, lead, tin, zinc or aluminum, or any and all mixtures thereof; and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_X COOH$, wherein the carbon atom count includes the carboxyl group (i.e. x=2-73). The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{1-8}$, i.e., $CH_3 (CH_2)_{16}COOH$), palmitic acid ($C_{16}$, i.e., $CH_3 (CH_2)_{14} COOH$), pelargonic acid ($C_9$, i.e., $CH_3 (CH_2)_7 COOH$) and lauric acid ($C_{12}$, i.e., $CH_3 (CH_2)_{10} OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3 (CH_2)_7 CH:CH(CH_2)_7 COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E.I. DuPont de Nemours and Co. Inc.

A preferred ionomer composition may be prepared by blending one or more of the unimodal ionomers, bimodal ionomers, or modified unimodal or bimodal ionomeric polymers as described herein, and further blended with a zinc neutralized ionomer of a polymer of general formula E/X/Y where E is ethylene, X is a softening comonomer such as acrylate or methacrylate and is present in an amount of from 0 to about 50, preferably 0 to about 25, most preferably 0, and Y is acrylic or methacrylic acid and is present in an amount from about 5 weight percent to about 25, preferably from about 10 to about 25, and most preferably about 10 to about 20 weight percent of the total composition.

A "specialty propylene elastomer" includes a thermoplastic propylene-ethylene copolymer composed of a majority amount of propylene and a minority amount of ethylene. These copolymers have at least partial crystallinity due to adjacent isotactic propylene units. Although not bound by any theory, it is believed that the crystalline segments are physical crosslinking sites at room temperature, and at high temperature (i.e., about the melting point), the physical crosslinking is removed and the copolymer is easy to process. According to one embodiment, a specialty propylene elastomer includes at least about 50 mole % propylene co-monomer. Specialty propylene elastomers can also include functional groups such as maleic anhydride, glycidyl, hydroxyl, and/or carboxylic acid. Suitable specialty propylene elastomers include propylene-ethylene copolymers produced in the presence of a metallocene catalyst. More specific examples of specialty propylene elastomers are illustrated below.

One example of illustrative specialty propylene elastomers is described in U.S. Pat. No. 6,525,157, to Kim et al., the entire contents of which is hereby incorporated by reference in its entirety. Specialty propylene elastomers are commercially available under the trade name VISTAMAXX from ExxonMobil Chemical.

In yet another embodiment, a blend of an ionomer and a block copolymer can be included in the composition that includes the specialty propylene elastomer. An example of a block copolymer is a functionalized styrenic block copolymer, the block copolymer incorporating a first polymer block having an aromatic vinyl compound, a second polymer block having a conjugated diene compound, and a hydroxyl group located at a block copolymer, or its hydrogenation product, in which the ratio of block copolymer to ionomer ranges from about 5:95 to about 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight. A preferred block copolymer is SEPTON HG-252. Such blends are described in more detail in commonly-assigned U.S. Pat. No. 6,861,474 and U.S. Patent Publication No. 2003/0224871, both of which are incorporated herein by reference in their entireties.

In a further embodiment, the core, mantle and/or cover layers (and particularly the outer cover layer) can comprise a composition prepared by blending together at least three materials, identified as Components A, B, and C, and melt-processing these components to form a polymer blend composition in situ incorporates a pseudo-crosslinked polymer network. Such blends are described in more detail in commonly-assigned U.S. Pat. No. 6,930,150, to Kim et al., the content of which is incorporated by reference herein in its entirety. Component A is a monomer, oligomer, prepolymer or polymer that incorporates at least five percent by weight of at least one type of an acidic functional group. Examples of such polymers suitable for use include, but are not limited to, ethylene/(meth)acrylic acid copolymers and ethylene/(meth) acrylic acid/alkyl(meth)acrylate terpolymers, or ethylene and/or propylene maleic anhydride copolymers and terpolymers. Examples of commercially available polymers include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-acrylic acid copolymers Nucrel 599, 699, 0903, 0910, 925, 960, 2806, and 2906 ethylene-methacrylic acid copolymers, which are sold by DuPont.

Also included are the bimodal ethylene/carboxylic acid polymers as described in U.S. Pat. No. 6,562,906, the contents of which are incorporated herein by reference. These polymers comprise ethylene/α, β-ethylenically unsaturated $C_{3-8}$ carboxylic acid high copolymers, particularly ethylene (meth)acrylic acid copolymers and ethylene, alkyl(meth) acrylate, (meth)acrylic acid terpolymers, having molecular weights of about 80,000 to about 500,000 which are melt blended with ethylene/α, β-ethylenically unsaturated $C_{3-8}$ carboxylic acid copolymers, particularly ethylene/(meth) acrylic acid copolymers having molecular weights of about 2,000 to about 30,000.

As discussed above, Component B can be any monomer, oligomer, or polymer, preferably having a lower weight percentage of anionic functional groups than that present in Component A in the weight ranges discussed above, and most preferably free of such functional groups. Preferred materials for use as Component B include polyester elastomers marketed under the name PEBAX and LOTADER marketed by ATOFINA Chemicals of Philadelphia, Pa.; HYTREL, FUSABOND, and NUCREL marketed by E.I. DuPont de Nemours & Co. of Wilmington, Del.; SKYPEL and SKYTHANE by S.K. Chemicals of Seoul, South Korea; SEPTON and HYBRAR marketed by Kuraray Company of Kurashiki, Japan; ESTHANE by Noveon; and KRATON marketed by Kraton Polymers. A most preferred material for use as Component B is SEPTON HG-252.

Component C is a base capable of neutralizing the acidic functional group of Component A and is a base having a metal cation. These metals are from groups IA, IB, IIA, IIB, IIIA, IIIB, IVA, IVB, VA, VB, VIA, VIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal oxides, metal carbonates, or metal acetates. In addition to Components A, B, and C, other materials commonly used in polymer blend compositions, can be incorporated into compositions prepared using the method of the present invention, including: crosslinking agents, co-crosslinking agents, accelerators, activators, UV-active chemicals such as UV initiators, EB-active chemicals, colorants, UV stabilizers, optical brighteners, antioxidants, processing aids, mold release agents, foaming agents, and organic, inorganic or metallic fillers or fibers, including fillers to adjust specific gravity.

The composition preferably is prepared by mixing the above materials thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system.

Illustrative polyamides for use in the compositions/golf balls disclosed include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

The polyamide may be any homopolyamide or copolyamide. One example of a group of suitable polyamides is thermoplastic polyamide elastomers. Thermoplastic polyamide elastomers typically are copolymers of a polyamide and polyester or polyether. For example, the thermoplastic polyamide elastomer can contain a polyamide (Nylon 6, Nylon 66, Nylon 1, Nylon 12 and the like) as a hard segment and a polyether or polyester as a soft segment. In one specific example, the thermoplastic polyamides are amorphous copolyamides based on polyamide (PA 12).

One class of copolyamide elastomers are polyether amide elastomers. Illustrative examples of polyether amide elastomers are those that result from the copolycondensation of polyamide blocks having reactive chain ends with polyether blocks having reactive chain ends, including:

(1) polyamide blocks of diamine chain ends with polyoxyalkylene sequences of dicarboxylic chains;

(2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and (3) polyamide blocks of dicarboxylic chain ends with polyether diols, the products obtained, in this particular case, being polyetheresteramides.

More specifically, the polyamide elastomer can be prepared by polycondensation of the components (i) a diamine and a dicarboxylate, lactams or an amino dicarboxylic acid (PA component), (ii) a polyoxyalkylene glycol such as polyoxyethylene glycol, polyoxy propylene glycol (PG component), and (iii) a dicarboxylic acid.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences is preferably between from about 300 to about 15,000, and more preferably between from about 600 to about 5,000. The molecular weight of the polyether sequences is preferably between from about 100 to about 6,000, and more preferably between from about 200 to about 3,000.

The amide block polyethers also may comprise randomly distributed units. These polymers may be prepared by the simultaneous reaction of polyether and precursor of polyamide blocks. For example, the polyether diol may react with a lactam (or alpha-omega amino acid) and a diacid which limits the chain in the presence of water. A polymer is obtained that has primarily polyether blocks and/or polyamide blocks of very variable length, but also the various reactive groups that have reacted in a random manner and which are distributed statistically along the polymer chain.

Suitable amide block polyethers include those as disclosed in U.S. Pat. Nos. 4,331,786; 4,115,475; 4,195,015; 4,839,441; 4,864,014; 4,230,848 and 4,332,920, which are incorporated herein by reference.

The polyether may be, for example, a polyethylene glycol (PEG), a polypropylene glycol (PPG), or a polytetramethylene glycol (PTMG), also designated as polytetrahydrofurane (PTHF). The polyether blocks may be along the polymer chain in the form of diols or diamines. However, for reasons of simplification, they are designated PEG blocks, or PPG blocks, or also PTMG blocks.

The polyether block comprises different units, such as units derived from ethylene glycol, propylene glycol, or tetramethylene glycol.

The amide block polyether comprises at least one type of polyamide block and one type of polyether block. Mixing of two or more polymers with polyamide blocks and polyether blocks also may be used. The amide block polyether also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of 1/1 to 3/1.

One type of polyetherester elastomer is the Pebax family, which elastomers are available from Elf-Atochem Company. Preferably, the choice can be made from among Pebax 2533, 3533, 4033, 1205, 7033 and 7233. Blends or combinations of Pebax 2533, 3533, 4033, 1205, 7033 and 7233 also can be prepared, as well. Pebax 2533 has a hardness of about 25 shore D (according to ASTM D-2240), a Flexural Modulus of 2.1 kpsi (according to ASTM D-790), and a Bayshore resilience of about 62% (according to ASTM D-2632). Pebax 3533 has a hardness of about 35 shore D (according to ASTM D-2240), a Flexural Modulus of 2.8 kpsi (according to ASTM D-790), and a Bayshore resilience of about 59% (according to ASTM D-2632). Pebax 7033 has a hardness of about 69 shore D (according to ASTM D-2240) and a Flexural Modulus of 67 kpsi (according to ASTM D-790). Pebax 7333 has a hardness of about 72 shore D (according to ASTM D-2240) and a Flexural Modulus of 107 kpsi (according to ASTM D-790).

Some examples of suitable polyamides for use include those commercially available under the trade names: PEBAX, CRISTAMID and RILSAN, marketed by Atofina Chemicals of Philadelphia, Pa.; GRIVORY and GRILAMID, marketed by EMS Chemie of Sumter, S.C.; TROGAMID and VESTAMID, available from Degussa; and ZYTEL marketed by E.I. DuPont de Nemours & Co., of Wilmington, Del.

The golf balls of the present invention may include the traditional rubber components used in golf ball applications including both natural and synthetic rubbers, such as cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71) compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, most preferably from about 2.2 to about 3.2. The polybutadiene rubbers have a Mooney viscosity ($ML_{1+4}$ (100° C.)) of from about 20 to about 80, preferably from about 30 to about 70, even more preferably from about 30 to about 60, most preferably from about 35 to about 50. The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C. As readily appreciated by one skilled in the art, blends of polybutadiene rubbers may also be utilized in the golf balls of the present invention, such blends may be prepared with any mixture of rare earth-based catalysts, nickel-based catalysts, or cobalt-based catalysts derived materials, and from materials having different molecular weights, molecular weight distributions and Mooney viscosity.

The cores of the golf balls of the present invention also may include 1,2-polybutadienes having differing tacticity, all of which are suitable as unsaturated polymers for use in the presently disclosed compositions, are atactic 1,2-polybutadiene, isotactic 1,2-polybutadiene, and syndiotactic 1,2-polybutadiene. Syndiotactic 1,2-polybutadiene having crystallinity suitable for use as an unsaturated polymer in the presently disclosed compositions are polymerized from a 1,2-addition of butadiene. The presently disclosed golf balls may include syndiotactic 1,2-polybutadiene having crystallinity and greater than about 70% of 1,2-bonds, more preferably greater than about 80% of 1,2-bonds, and most preferably greater than about 90% of 1,2-bonds. Also, the 1,2-polybutadiene may have a mean molecular weight between from about 10,000 to about 350,000, more preferably between from about 50,000 to about 300,000, more preferably between from about 80,000 to about 200,000, and most preferably between from about 10,000 to about 150,000. Examples of suitable syndiotactic 1,2-polybutadienes having crystallinity suitable for use in golf balls are sold under the trade names RB810, RB820, and RB830 by JSR Corporation of Tokyo, Japan. These have more than 90% of 1,2 bonds, a mean molecular weight of approximately 120,000, and crystallinity between about 15% and about 30%.

The cores of the golf balls of the present invention also may include polyalkenamers. Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see *Rubber Chem. & Tech.*, Vol. 47, page 511-596, 1974, which is incorporated herein by reference. Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubbers used in the present disclosure exhibit excellent melt processability above their sharp melting temperatures and exhibit high miscibility with various rubber additives as a major component without deterioration of crystallinity, which in turn facilitates injection molding. Thus, unlike synthetic rubbers typically used in golf ball preparation, polyalkenamer-based compounds can be prepared that are injection moldable. This is disclosed in copending U.S. application Ser. No. 11/335,070, filed on Jan. 18, 2006, in the name of Hyun Kim et al., the entire content of which is incorporated herein by reference.

As used herein, the term "injection moldable" as applied to the polyalkenamer rubber or polyalkenamer/polyamide compositions used as described herein refers to a material amenable to use in injection molding apparatus designed for use with typical thermoplastic resins. In one example, the term injection moldable composition as applied to the uncrosslinked polyalkenamer rubbers used in the present disclosure means compositions having a viscosity using a Dynamic Mechanical Analyzer (DMA) and ASTM D4440 at 200° C. of less than about 5,000 Pa-sec, preferably less than about 3,000 Pa-sec, more preferably less than about 2,000 Pa-sec and even more preferably less than about 1,000 Pa-sec. and a storage modulus (G') at 1 Hz measured using a Dynamic Mechanical Analyzer (DMA) and ASTM D4065, and ASTM D4440, at 25° C., and 1 Hz of greater than about $1\times10^7$ $dyn/cm^2$, preferably greater than about $1.5\times10^7$ $dyn/cm^2$, more preferably greater than about $1\times10^8$ $dyn/cm^2$, and most preferably greater than about $2\times10^8$ $dyn/cm^2$.

A more preferred composition for use in the golf balls of the present invention, and preferably for use in the golf ball core or intermediate layers, is a blend of polyalkenamer and polyamide as also disclosed in copending U.S. application Ser. No. 11/335,070, filed on Jan. 18, 2006, in the name of Hyun Kim et al., the entire contents of which are hereby incorporated by reference. The polyalkenamer/polyamide composition used to prepare the golf ball contains from about 2 to about 90 weight percent, preferably from about 5 to about 80 weight percent, more preferably from about 7 to 70 weight percent, and even more preferably from about 10 to 60 weight percent (based on the final weight of the injection moldable composition) of one or more polyalkenamer polymers, particularly polyalkenamers of a cycloalkene having from about 5 to about 20, preferably, about 5 to about 15, and most preferably about 5 to about 12 ring carbon atoms. The polyalkenamers may be prepared by ring opening metathesis polymerization of one or more cycloalkenes in the presence of organometallic catalysts as described in U.S. Pat. Nos. 3,492,245, and 3,804,803, the entire contents of both of which are incorporated herein by reference.

The polyalkenamer/polyamide composition used to prepare the golf ball also contains from about 10 to about 98 weight percent, preferably from about 20 to about 95 weight percent, more preferably from about 30 to 93 weight percent, and even more preferably from about 40 to 90 weight percent (based on the final weight of the injection moldable composition) of one or more polyamide polymers.

According to certain embodiments, the polyalkenamer/polyamide composition contains at least about 60 weight percent, preferably at least about 70 weight percent, and more preferably at least about 80 weight percent of at least one polyamide, based on the total polymer amount of the layer(s) or core that is made from the polyalkenamer/polyamide composition. In further embodiments, the polyamide ingredient of the polyalkenamer/polyamide composition is the major ingredient of the material used to form at least one component (e.g., the core or inner cover layer) of the golf ball. As used herein "major ingredient" means that the polyamide is present in an amount of at least about 50 weight percent, based on the total weight of all the ingredients in the material.

When synthetic rubbers such as the aforementioned polybutadienes or polyalkenamers and their blends are used in the golf balls of the present invention they may contain further materials typically often used in rubber formulations including crosslinking agents, co-crosslinking agents, peptizers and accelerators.

Suitable cross-linking agents for use in the golf balls of the present invention include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl)peroxide. The cross-linking agents can be blended in total amounts of about 0.05 part to about 5 parts, more preferably from about 0.2 part to about 3 parts, and most preferably from about 0.2 part to about 2 parts, by weight of the cross-linking agents per 100 parts by weight of the unsaturated polymer.

Each cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hour has a decomposition temperature of 138° C. and 2,5-dimethyl-2,5-di-(t-butylperoxy)hexyne-3 at $t_{1/2}$=0.1 hour has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from about 5:95 to about 95:5, or more preferably from about 10:90 to about 50:50.

Besides the use of chemical cross-linking agents, exposure of the composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

The rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an α,β-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the synthetic rubber.

The core compositions used in the present invention also may incorporate one or more of the so-called "peptizers". The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl)disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol and dibenzamido diphenyldisulfide.

Examples of the metal salt of an organic sulfur compound include sodium, potassium, lithium, magnesium calcium, barium, cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$, where $R^1$, $R^2$, $R^3$ and $R^4$ are selected from hydrogen, a $C_1$-$C_{20}$ aliphatic, cycloaliphatic or aromatic moiety, or any and all combinations thereof, with the most preferred currently being the $NH^{4+}$ salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, a purine peptizer, a pyrimidine peptizer, a diazine peptizer, a pyrazine peptizer, a triazine peptizer, a carbazole peptizer, or combinations of such peptizers.

Suitable peptizers also may include one or more additional functional groups, such as halogens, particularly chlorine; a sulfur-containing moiety exemplified by thiols, where the functional group is sulfhydrl (—SH), thioethers, where the functional group is —SR, disulfides, (R1S—SR2), etc.; and combinations of functional groups. Such peptizers are more fully disclosed in copending U.S. Application No. 60/752,475 filed on Dec. 20, 2005, in the name of Hyun Kim et al., the entire contents of which are herein incorporated by reference.

The peptizer, if employed in the golf balls of the present invention, is present in an amount up to about 10, from about 0.01 to about 10, preferably of from about 0.10 to about 7, more preferably of from about 0.15 to about 5 parts by weight per 100 parts by weight of the synthetic rubber component. The core compositions also can comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook:* 13$^{th}$ Edition (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts. The synthetic rubber composition can further incorporate from about 0.1 part to about 10 parts by weight of the accelerator per 100 parts by weight of the rubber. More preferably, the ball composition can further incorporate from about 0.2 part to about 5 parts, and most preferably from about 0.5 part to about 1.5 parts, by weight of the accelerator per 100 parts by weight of the rubber.

The polymeric compositions used to prepare the golf balls of the present invention also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, or any and all combinations thereof. Preferred examples of fillers include metal oxides, such as zinc oxide and magnesium oxide. In another preferred embodiment the filler comprises a continuous or non-continuous fiber. In another preferred embodiment the filler comprises one or more so called nanofillers, as described in U.S. Pat. No. 6,794,447 and copending U.S. patent application Ser. No. 10/670,090, filed on Sep. 24, 2003, and copending U.S. patent application Ser. No. 10/926,509, filed on Aug. 25, 2004, each of which is incorporated herein by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy- group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

Nanofillers when added into a matrix polymer, such as the polyalkenamer rubber, can be mixed using any suitable method. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some circumstances, further penetration of the matrix polymer chains into the aggregate structure separates the platelets, and leads to a complete disruption of the platelet's stacked structure in the aggregate. Thus, when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

Physical properties of the polymer will change with the addition of nanofiller. The physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans., uses a clay loading of from about 3% to about 5% and has a tensile strength of 11,800 psi and a specific gravity of 1.14. A conventional 30% mineral-filled material has a tensile strength of 8,000 psi and a specific gravity of 1.36. Using nanocomposite materials with lower inorganic materials loadings than conventional fillers provides the same properties, and this allows products comprising nanocomposite fillers to be lighter than those with conventional fillers, while maintaining those same properties.

Nanocomposite materials are materials incorporating up to about 20%, or from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. Nos. 5,962,553 to Ellsworth, 5,385,776 to Maxfield et al., and 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

For the polyalkenamers, the nanofiller material is added in an amount up to at least about 20 weight percent, from about 0.1% to about 20%, preferably from about 0.1% to about 15%, and most preferably from about 0.1% to about 10% by weight (based on the final weight of the polymer matrix material) of nanofiller reacted into and substantially dispersed through intercalation or exfoliation into the structure of the core polymer matrix.

If desired, the various polymer compositions used to prepare the golf balls of the present invention can additionally contain other conventional additives such as plasticizers, pigments, antioxidants, U.V. absorbers, optical brighteners, or any other additives generally employed in plastics formulation or the preparation of golf balls.

Another particularly well-suited additive for use in the compositions of the present invention includes compounds having the general formula

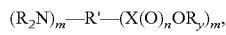

where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. patent application Ser. No. 11/182,170, filed on Jul. 14, 2005, the entire contents of which are incorporated herein by reference. These materials include, without limitation, caprolactam, oenantholactam, decanolactam, undecanolactam, dodecanolactam, caproic 6-amino acid, 11-aminoundecanoicacid, 12-aminododecanoic acid, diamine hexamethylene salts of adipic acid, azeleic acid, sebacic acid and 1,12-dodecanoic acid and the diamine nonamethylene salt of adipic acid, 2-aminocinnamic acid, L-aspartic acid, 5-aminosalicylic acid, aminobutyric acid; aminocaproic acid; aminocapyryic acid; 1-(aminocarbonyl)-1-cyclopropanecarboxylic acid; aminocephalosporanic acid; aminobenzoic acid; aminochlorobenzoic acid; 2-(3-amino-4-chlorobenzoyl)benzoic acid; aminonaphtoic acid; aminonicotinic acid; aminonorbornanecarboxylic acid; aminoorotic acid; aminopenicillanic acid; aminopentenoic acid; (aminophenyl)butyric acid; aminophenyl propionic acid; aminophthalic acid; aminofolic acid; aminopyrazine carboxylic acid; aminopyrazole carboxylic acid; aminosalicylic acid; aminoterephthalic acid; aminovaleric acid; ammonium hydrogencitrate; anthranillic acid; aminobenzophenone carboxylic acid; aminosuccinamic acid, epsilon-caprolactam; omega-caprolactam, (carbamoylphenoxy)acetic acid, sodium salt; carbobenzyloxy aspartic acid; carbobenzyl glutamine; carbobenzyloxyglycine; 2-aminoethyl hydrogen sulfate; aminonaphthalenesulfonic acid; aminotoluene sulfonic acid; 4,4'-methylene-bis-(cyclohexylamine)carbamate and ammonium carbamate.

Most preferably the material is selected from 4,4'-methylene-bis-(cyclohexylamine)carbamate (commercially available from R.T. Vanderbilt Co., Norwalk Conn. under the trade name Diak® 4), 11-aminoundecanoicacid, 12-aminododecanoic acid, epsilon-caprolactam, omega-caprolactam, or any and all combinations thereof.

In an especially preferred embodiment a nanofiller additive component in the golf ball of the present invention is surface modified with a compatibilizing agent comprising the earlier described compounds having the general formula

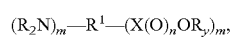

A most preferred embodiment would be a filler comprising a nanofiller clay material surface modified with an amino acid including 12-aminododecanoic acid. Such fillers are available from Nanonocor Co. under the trade name Nanomer 1.24TL.

The filler can be blended in variable effective amounts, such as amounts of greater than 0 to at least about 80 parts, and more typically from about 10 parts to about 80 parts, by weight per 100 parts by weight of the base rubber. If desired, the rubber composition can additionally contain effective amounts of a plasticizer, an antioxidant, and any other additives generally used to make golf balls.

Various compositions used as a component of the golf balls of the present invention also may comprise a monomeric amide modifier or modifiers, such as a monomeric aliphatic and/or aromatic amide polymer modifier or modifiers. An amide is any organic compound containing the group —$CONR_2$, where R is hydrogen; an aliphatic group, such as an alkyl group, an alkenyl group, or an alkynyl group; an aromatic group; and combinations thereof. Amides useful for the present invention may be a primary amide, a secondary amide, or a tertiary amide, and combinations thereof, i.e. a particular compound may have two or more amide moieties where one of the amide moieties is a primary, secondary or tertiary amide and the other amide moiety has a degree of substitution different from the first amide moiety. For example, if the first amide is a primary amide, the second amide moiety may be secondary or tertiary.

The amide may be saturated or unsaturated. Moreover, unsaturated amides may have more than one site of unsaturation, including aromatic amides. Alkene amides may have a cis double bond or a trans double bond. For compounds having plural sites of unsaturation, such double bonds can be all cis, all trans, or any combination of cis and trans double bonds. Certain compounds perform better as polymer modifier if the olefin is entirely or predominantly cis, or entirely or predominantly trans. Moreover, the position of the double bond in the compound may affect the compound's usefulness for modifying polymer compositions.

Amidated aliphatic and/or aromatic compounds useful for the present invention typically have from about 1 to about 100 carbon atoms, more typically from about 2 to about 80 carbon atoms, even more typically from about 5 to about 50 carbon atoms, even more typically from about 5 to about 30 carbon atoms, and most typically from about 10 to about 25 carbon atoms.

Fatty acid amides are a particularly useful genus of amides for use with the present invention. Fatty acids are any of a class of aliphatic monocarboxylic acids that form part of a lipid molecule and can be derived from fat by hydrolysis; fatty acids are simple molecules built around a series of carbon atoms linked together in a chain, typically a chain having from about 12 to about 22 carbon atoms.

Particular examples of amides for use with the present invention include, without limitation, primary amides, such as stearamide, behenamide, oleamide, and erucamide; secondary amides, such as stearyl erucamide, erucyl erucamide, oleyl palimitamide, stearyl stearamide, erucyl stearamide, and the like; ethylene bis-amides, such as N,N'ethylenebisstearamide, N,N'ethylenebisolamide, and the like; amidated natural waxes, such as carnauba wax amide, rice wax amide, montan wax amide, and the like; and combinations of any two or more of any suitable amide.

Suitable amide polymer composition modifiers can include a functional group or groups other than the amide functionality. For example and without limitation, amide polymer modifiers also can include additional functional groups such as hydroxyl, sulfhydryl, halides, glycidyl, carbonyl, carboxyl, anhydryl, ether, epoxide, amine, etc., and combinations of all such functional groups.

The polymer compositions of the present invention include amounts of the amide modifying agent effective to modify the compositions as desired. For example, amide modifiers can be used to provide more desirable rheological properties relative to non-modified polymeric compositions, more desirable mechanical properties relative to non-modified polymeric compositions, and combinations of rheological and mechanical properties. By way of example, it was surprising to find that useful polymeric compositions modified with a suitable monomeric amide, or amides, could be made such that the rheological properties, for example the melt flow index (MFI), could be advantageously modified. At the same time, mechanical properties, such as hardness, flexural modulus and COR, could be substantially maintained, and for some formulations improved, relative to the same composition without the monomeric amide, or amides. It was particularly surprising that useful amounts of modifying agents could be increased to relatively high concentrations, such as 1% by weight or greater, to modify certain polymer properties advantageously while maintaining suitable COR values.

By way of example and without limitation, it currently is believed that amide modifiers can be added in amounts ranging from about 0.1 to about 50 parts per hundred (pph), more typically from about 0.1 to about 20 pph, more typically from about 0.5 pph to about 15 pph, and most typically from about 1 to about 10 pph, based on the weight of the polymeric portion of the composition.

Golf balls within the scope of the present invention also can include, in suitable amounts, one or more additional ingredients generally employed in golf ball compositions. Agents provided to achieve specific functions, such as additives and stabilizers, can be present. Exemplary suitable ingredients include colorants, antioxidants, colorants, dispersants, mold releasing agents, processing aids, fillers, or any and all combinations thereof. Although not required, UV stabilizers, or photo stabilizers, such as substituted hydroxphenyl benzotriazoles, may be utilized in the present invention to enhance the UV stability of the final compositions. An example of a commercially available UV stabilizer is the stabilizer sold by Ciba Geigy Corporation under the trade name TINUVIN.

Typically, the golf ball core is made by mixing together the various components and other additives with or without melting them. Dry blending equipment, such as a tumble mixer, V-blender, ribbon blender, or two-roll mill, can be used to mix the compositions. The golf ball compositions also can be mixed using a mill, internal mixer such as a Banbury or Farrel continuous mixer, extruder or combinations of these, with or without application of thermal energy to produce melting. The various core components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing. If radiation is a cross-linking agent, then the mixture comprising the unsaturated polymer and other additives can be irradiated following mixing, during forming into a part such as the core of a ball, or after forming.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking. The temperature and duration of the molding cycle are selected based upon the type of peroxide and peptizer selected. The molding cycle may have a single step of molding the mixture at a single temperature for fixed time duration.

For example, a preferred mode of preparation for the cores used in the present invention is to first mix the core ingredients on a two-roll mill to form slugs of approximately 30-40 g and then compression mold in a single step at a temperature between 150 to 180° C. for times between 5 and 12 minutes.

The various core components also may be combined to form a golf ball by an injection molding process, which is also well known to one of ordinary skill in the art. Although the curing time depends on the various materials selected, those of ordinary skill in the art will be readily able to adjust the curing time upward or downward based on the particular materials used and the discussion herein.

The various intermediate layer and/or cover formulations may be produced using a twin-screw extruder or can be blended manually or mechanically prior to the addition to the injection molder feed hopper. Finished golf balls may be prepared by initially positioning the solid preformed core in an injection-molding cavity followed by uniform injection of the intermediate and/or cover layer composition sequentially over the core. The cover formulations can be injection molded around the cores to produce golf balls of the required diameter.

Alternatively, the cover layers also may be formed around the core by first forming half shells by injection molding followed by compression molding the half shells about the core to form the final ball. Covers also may be formed around the cores using compression molding. Cover materials for compression molding also may be extruded or blended resins or castable resins.

In the case of the reduced-yellowing thermoset of the present invention casting is a most preferred method for making desired articles, such as golf balls.

Referring to the drawing in FIG. 1, there is illustrated a two-piece golf ball 10, which comprises a solid center or core 12, which may be formed as a solid body of the herein described compositions, and in the shape of a sphere, which core is further enclosed by an outer cover layer 14.

In one embodiment of the present invention, two-piece balls are disclosed comprising a core, and a cover comprising the reduced-yellowing polyurethane and/or polyurea compositions.

The core of the two-piece golf balls of the present invention has a diameter of from about 0.5 to about 1.62, preferably from about 0.7 to about 1.60, more preferably from about 1 to about 1.58 inches.

The core of the two-piece golf balls of the present invention has a PGA compression of from about 10 to about 100, preferably from about 35 to about 90, more preferably from about 40 to about 80.

The cover of the two-piece golf balls of the present invention has a thickness of from about 0.01 to about 0.20, preferably from about 0.02 to about 0.15, more preferably from about 0.03 to about 0.10, and most preferably from about 0.03 to about 0.07 inch.

In addition, the cover of the two-piece golf balls of the present invention has a hardness of from about 25 to about 80, more preferably from about 30 to about 70, even more preferably from about 40 to about 60 Shore D.

The two-piece golf ball of the present invention has a PGA ball compression greater than about 30, preferably greater than 40, more preferably greater than about 50, most preferably greater than about 60.

Referring to FIG. 2, a three-piece golf ball 20 is illustrated comprising a core 22, an intermediate layer 24 and an outer cover layer 26. Golf ball 20 also typically includes plural dimples 28 formed in the outer cover layer 26 and arranged in various desired patterns.

The core of the three-piece golf balls of the present invention has a diameter of from about 0.5 to about 1.62, preferably from about 0.7 to about 1.60, more preferably from about 1 to about 1.58 inches.

The core of the three-piece golf balls of the present invention has a PGA compression of from about 10 to about 100, preferably from about 35 to about 90, more preferably from about 40 to about 80.

The cover of the three-piece golf balls of the present invention has a thickness of from about 0.01 to about 0.20 inch, preferably from about 0.02 to about 0.15 inch, more preferably from about 0.03 to about 0.10 inch and most preferably from about 0.03 to about 0.07 inch.

The cover of the three-piece golf balls of the present invention also has a hardness of from about 25 to about 80, more preferably from about 30 to about 70, even more preferably from about 40 to about 60 Shore D.

The three-piece golf balls of the present invention has a PGA ball compression greater than about 30, preferably greater than 40, more preferably greater than about 50, most preferably greater than about 60.

Although FIGS. 1 and 2 illustrate only two- and three-piece golf ball constructions, golf balls of the present invention may comprise from 0 to at least 5 intermediate layer(s), preferably from 0 to 3 intermediate layer(s), more preferably from 1 to 3 intermediate layer(s), and most preferably 1 to 2 intermediate layer(s).

The core of the golf balls of the present invention having two or more intermediate layers has a diameter of from about 0.5 to about 1.62, preferably from about 0.7 to about 1.60, more preferably from about 1 to about 1.58, yet more preferably from about 1.20 to about 1.54, and most preferably from about 1.40 to about 1.50 inches.

The core the golf balls of the present invention having two or more intermediate layers has a PGA compression of from about 10 to about 100, preferably from about 35 to about 90, more preferably from about 40 to about 80.

The core the golf balls of the present invention having two or more intermediate layers also may comprise a center and one or more core layers disposed around the center. These core layers may be made from the same rubber as used in the center portion, or may be a different thermoplastic elastomer. The various core layers (including the center) may each exhibit a different hardness. The difference between the center hardness and that of the next adjacent layer, as well as the difference in hardness between the various core layers is greater than 2, preferably greater than 5, most preferably greater than 10 units of Shore D.

In one preferred embodiment, the hardness of the center and each sequential layer increases progressively outwards from the center to outer core layer.

In another preferred embodiment, the hardness of the center and each sequential layer decreases progressively inwards from the outer core layer to the center.

The intermediate layers of the golf balls of the present invention having two or more intermediate layers has a thickness of about 0.01 to about 0.50, preferably from about 0.02 to about 0.30 or more preferably from about 0.03 to about 0.20 or most preferably from about 0.03 to about 0.10 inch.

The intermediate layers of the golf balls of the present invention having two or more intermediate layers also has a hardness greater than about 25, preferably greater than about 30, more preferably greater than about 40, and most preferably greater than about 50, Shore D units as measured on the ball.

The intermediate layers of the golf balls of the present invention having two or more intermediate layers also has a flexural modulus from about 5 to about 500, preferably from about 15 to about 400, more preferably from about 20 to about 300, still more preferably from about 25 to about 200, and most preferably from about 30 to about 150 kpsi.

The cover layer of the golf balls of the present invention having two or more intermediate layers has a thickness of about 0.01 to about 0.10, preferably from about 0.02 to about 0.08, more preferably from about 0.03 to about 0.06 inch.

The cover layer of the golf balls of the present invention having two or more intermediate layers also has a hardness from about 40 to about 70, preferably from about 45 to about 70 or about 50 to about 70, more preferably from about 47 to about 68 or about 45 to about 70, and most preferably from about 50 to about 65 Shore D as measured on the ball.

The COR of the two-, three- or multi-piece golf balls of the present invention is greater than about 0.760, preferably greater than about 0.780, more preferably greater than 0.790, most preferably greater than 0.795, and especially greater than 0.800 at 125 ft/sec inbound velocity.

The COR of the two-, three- or multi-piece golf balls of the present invention is also greater than about 0.760, preferably greater than about 0.780, more preferably greater than 0.790, most preferably greater than 0.795, and especially greater than 0.800 at 143 ft/sec inbound velocity.

EXAMPLES

The following examples are provided to illustrate certain features of working embodiments of the disclosed invention. A person of ordinary skill in the art will appreciate that the invention is not limited to those features exemplified by these working embodiments.

Shear Cut Resistance was measured using a swing robot and a 56 degree wedge that generates golf ball cover damage when struck aggressively. Tee location was generally setup further back "in the stance" so the club impacts the golf ball in the downswing. Prior to every impact, the club face is cleaned and sprayed with water. The water acts as a lubricant and causes the balls to slide up the club face. As the ball slides up the face, the club grooves damage the ball. The robot was setup to generate a level of damage on a control ball of approximately 2.0 on the evaluation scale. Once setup, test groups are hit with the same setup conditions. Golf balls with shear scores above 3 are considered less durable.

Club: TaylorMade TP 56 deg Y groove
Setup ball: TaylorMade Distance Plus
Swing speed: 60 mph
Evaluation scale: 1-Excellent, 2-Good, 3-Average, 4-Fair, 5-Poor PGA compression, C.O.R., and Shore D hardness were conducted on materials and/or golf balls made according to the present disclosure using the test methods as defined below.

Shore D hardness was measured in accordance with ASTM Test D2240.

Compression is measured by applying a spring-loaded force to the sphere to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. The value is taken shortly after applying the force and within at least 5 secs if possible. Compression measured with this instrument is also referred to as PGA compression.

The approximate relationship that exists between Atti or PGA compression and Riehle compression can be expressed as:

(Atti or PGA compression)=(160−Riehle Compression).

Thus, a Riehle compression of 100 would be the same as an Atti compression of 60.

The initial velocity of a golf ball after impact with a golf club is governed by the United States Golf Association ("USGA"). The USGA requires that a regulation golf ball have an initial velocity of no more than 250 feet per second±2% or 255 feet per second. The USGA initial velocity limit is related to the ultimate distance that a ball may travel (280 yards±6%), and is also related to the coefficient of restitution ("COR"). The coefficient of restitution is the ratio of the relative velocity between two objects after direct impact to the relative velocity before impact. As a result, the COR can vary from 0 to 1, with 1 being equivalent to a completely elastic collision and 0 being equivalent to a completely inelastic collision. Since a ball's COR directly influences the ball's initial velocity after club collision and travel distance, golf ball manufacturers are interested in this characteristic for designing and testing golf balls.

One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/sec to 180 ft/sec. As the ball travels toward the steel plate, it activates each light screen so that the time at each light screen is measured. This provides an incoming time period proportional to the ball's incoming velocity. The ball impacts the steel plate and rebounds through the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

The COR depends on the golf ball construction as well as the chemical composition of the various layers.

Example 1

This example provides a comparison of ball physicals using inventive and comparative urethane covers formulations. Polybutadiene cores were generated based on Nd-based polybutadiene formulated with ZnO, ZDA, ammonium pentachlorothiophenol ($NH_4PCTP$), and organic peroxide. All the formulations were mixed on a Labtech 2-roll mill using no additional heat. The cores, having a diameter of 1.420 inches, were molded the same day the batch was mixed and were cured at 180° C. for 12 minutes.

The inner-mantled cores were generated based on polyalkenamer-based material (Vestenamer 8012 from Degussa) using a curing agent consisting of a peroxide mixture with the additional components of zinc diacrylate, zinc oxide and zinc pentachlorothiophenol which was injection molded on the polybutadiene cores. The inner-mantled cores, having a diameter of 1.58 inches, were injection molded and were inserted into compression molding cavities having a diameter of 1.52 inches to cure the inner-mantle at 180° C. for 12 minutes.

The outer-mantled cores, having a diameter of 1.62 inches, were prepared by injection molding a Surlyn mixture (a 50/50 weight percent mixture of Surlyn 8150/Surlyn 9150) on the inner-mantled cores.

Two different urethane cover compositions having different curative mixtures were tested. For Comparative Example 1, a prepolymer of TDI and PTMEG (LF 950 LC, Crompton) was cured by reaction with a mixture of E100/E300 (75/25 weight percent respectively). For the inventive composition of Example 1, E300 was replaced with the dicyanidiamide, (Dyhard, Degussa) and the mixing ratio of the E100/Dyhard mixture was adjusted to have approximately same gel time as the comparative curative mixture (95/5 weight percent respectively). In both cases, a urethane dispenser was used for proper mixing of two curatives and obtaining accurate weight of curative mixture. The FlackTek high speed mixer was used for uniform mixing of prepolymer and curative mixture, and then the mixture was poured into the cavities for molding. The molding temperature and cycle was 55° C. and 7 minutes, respectively. The balls were then painted with two coats of a white pigmented paint supplied by RedSpot and containing a standard UV protection package. No clear coat was applied. The properties of the resulting balls are summarized in Table 1.

These data show that substitution of the Dyhard curative for the Ethacure 300 results in no loss in Shear Cut resistance or ball COR for the same cover thickness and ball core and mantle(s) construction.

TABLE 1

| Polybutadiene Core | |
|---|---|
| Core size (in) | 1.42 |
| Compression | 67 |
| COR | 0.814 |
| Inner-mantled core | |
| Size (in) | 1.52 |
| Compression | 77 |
| COR | NA |
| Outer-mantled core | |
| Size (in) | 1.62 |
| Compression | 92 |
| COR | 0.836 |

| Cover | | |
|---|---|---|
| | Comp Ex 1 | Ex 1 |
| Composition (wt ratio) | E100/E300 (75/25) | E100/Dyhard (95/5) |
| Thickness (in) | 0.03 | 0.03 |
| Compression | 92 | 94 |
| Shore D Hardness | 58.5 | 56.5 |
| COR | 0.829 | 0.828 |
| Shear-cut resistance | 2.1 | 2.0 |

Example 2

This example concerns QUV experiments conducted on unpainted specimens. Two different urethane cover compositions having different curative mixtures were tested. The TDI and PTMEG prepolymer (LF 950 LC, Crompton) was cured by reaction with a mixture of 75/25 E100/E300 (based on weight percent) is the current curative mixture used for urethane cover. In this example, E300 was replaced with the dicyandiamide, Dyhard (Degussa) and adjusted mixing ratio to have approximately same gel time as the current curative mixture. A urethane dispenser was used for proper mixing of two curatives and obtaining accurate weight of curative mixture. The FlackTek high speed mixer was used for uniform mixing of prepolymer and curative mixture, and then the mixture was poured into a mold to form an approximately 2 inches square specimen of thickness 0.2 inch for molding. The molding temperature was 55° C. for 7 minutes.

No paint or other UV protection package was used.

The UV experiments on the urethane specimens were performed using QUV weathering tester from Q-Panel. The exposure time was up to 6 hours and dE*ab values taken at different times of UV exposure at irradiance of 0.83 W/m$^2$/nm at 45° C. A Minolta spectrophotometer CM-3500d was used for dE*ab measurements. The results are summarized in Table 2.

TABLE 2

| | dE * ab | | |
|---|---|---|---|
| QUV Exposure time (min.) | Comp Ex 2a (75/25) E100/E300 | Ex 2 (95/5) E100/Dyhard | Comp Ex 2b (E100) |
| 10 | 30.34 | 0.25 | 0.57 |
| 30 | 35.92 | 0.49 | 1.15 |
| 60 | 39.23 | 0.86 | 1.86 |
| 180 | 45.4 | 3.34 | 5.29 |
| 360 | 49.07 | 7.29 | 10.45 |

These data show that substitution of the Dyhard curative for Ethacure 300 results in significantly improved UV resistance which is even better than the single E100 alone.

Example 3

This example concerns QUV experiments performed on painted balls. The ball of Example 1 made with the Dyhard containing curative mixture and having two coats of paint was compared with the painted commercially available balls, the Callaway HX Tour cast urethane ball, and the Titleist Pro VI cast urethane ball. The balls were again measured for UV resistance on a QUV weathering tester from Q-Panel. In addition, the cover of the unexposed ball was removed and the inside surface of the cover material exposed under the same conditions as the ball itself in order to determine the UV resistance of the cover formulation as compared to that of the painted cover, the "reversed" value in Table 3). This is important in determining the tendency to yellow of a given after the paint protection has been compromised by scuffing or shearing of the cover during play. The exposure time was 48 hours including 4 cycles of 8 hours of UV exposure at irradiance of 0.83 W/m$^2$/nm at 45° C. and 4 hours of condensation at 40° C. The results are summarized in Table 3.

TABLE 3

| Ball | dE * ab |
|---|---|
| Example 3 (painted) | 0.11 |
| Ex 3 (reversed) | 20.00 |
| HX Tour | 0.36 |
| HX Tour (reversed) | 38.66 |
| Pro V1 | 6.85 |
| Pro V1 (reversed) | 46.86 |

These data again show the improved UV resistance of the polyurethane balls of the present invention as compared to the polyurethane covered HX Tour and Pro VI.

Example 4

This example concerns the effect of varying amount of UV stabilizer on unpainted specimens. Two different urethane cover compositions having different curative mixtures were tested. For Comparative Example 4, a prepolymer of TDI and PTMEG (LF 950 LC, Crompton) was cured by reaction with a mixture of 75/25 E100/E300 (based on weight percent). In Example 4 the E300 was replaced with the dicyandiamide, Dyhard (Degussa) and adjusted mixing ratio to have approximately same gel time as the current curative mixture equivalent to a mixture of 95E100/5 Dyhard. A urethane dispenser was used for proper mixing of two curatives and obtaining accurate weight of curative mixture. A UV package supplied by Ciba Specialty Chemicals, a mixture of 1:1:1 by weight of Iganox1010, Tinuvin 328 and Tinuvin123 ("UV1"), was added to the samples at different levels. The FlackTek high speed mixer was used for uniform mixing of prepolymer and curative mixture, and UV stabilizer and then the mixture was poured into a mold to form an approximately 2 inch square specimen of thickness 0.2 inch for molding. The molding temperature was 55° C. for 7 minutes.

The UV experiments on the urethane specimens were performed using QUV weathering tester from Q-Panel. The exposure time was 48 hours including 4 cycles of 8 hours of UV exposure at irradiance of 0.83 W/m$^2$/nm at 45° C. and 4 hours of condensation at 40° C.

A Minolta spectrophotometer CM-3500d was used for dE*ab measurements. The results are summarized in Table 4.

TABLE 4*

| QUV Exposure time (min.) | Comp Ex 4 75/25 E100/E300 dE * ab | | Ex 4 95/5 E100/Dyhard dE * ab | | |
|---|---|---|---|---|---|
| | w/o UV1 | +0.9 pph UV1 | +0.3 pph UV1 | +0.6 pph UV1 | +0.9 pph UV1 |
| 10 | 24.7 | 16.6 | 0.53 | 0.29 | 0.20 |
| 30 | 32.6 | 24.3 | 0.42 | 0.57 | 0.37 |
| 60 | 37.4 | 28.4 | 0.72 | 0.94 | 0.43 |
| 180 | 44.1 | 36.1 | 2.02 | 1.65 | 0.77 |
| 420 | 49.8 | 42.6 | 4.92 | 3.94 | 2.13 |
| 1440 | 53.16 | 46.81 | 12.51 | 10 | 6.63 |
| 2880 | 56.5 | 51.47 | 19.47 | 15.8 | 12.13 |

*all UV1 amounts are based on the final weight of curative not on the final weight of the polyurea.

These data show that in the absence of a UV stabilizer the comparative composition has a dE*ab value of 24.7 after 10 minutes, which increases to a value of 56.5 after 48 hours. In the presence of 0.9 pph of the UV stabilizer the value after 48 hours is still 51.47. In comparison, the specimen using an embodiment of the reduced-yellowing composition of the present invention in the presence of 0.9 pph UV stabilizer has a much lower initial value of 0.2, which only increases after 48 hours to 12.13 again. Even at a level as low as 0.3 pph UV stabilizer the values for the inventive composition are almost three times better than the comparative example at 0.9 pph UV stabilizer after 48 hours.

Example 5

This example concerns the effect of paint layers on the UV performance of the ball. For Examples 5a and 5b and comparative example 5, a golf ball was prepared as for Example 1 (but omitting inner mantle and varying the number of coating layers) and using the following cover formulations. For comparative example 5, a prepolymer of TDI and PTMEG (LF 950 LC, Crompton) was cured by reaction with a mixture of 75/25 E100/E300 (based on weight percent). For Example 5a and 5 b, the E300 was replaced with the dicyanodiamide, Dyhard (Degussa) and adjusted mixing ratio to have approximately same gel time as the current curative mixture equivalent to a mixture of 95E100/5 Dyhard. A urethane dispenser was used for proper mixing of two curatives and obtaining accurate weight of curative mixture. A UV package supplied by Ciba Specialty Chemicals, a mixture of 1:1:1 by weight of Iganox1010, Tinuvin 328, and Tinuvin123 ("UV1"), was added to the samples at different levels. Example 5a used no additional UV stabilization in the cover formulation whereas for Example 5b, 1.2 pph of a UV package ("UV1") was added. UV1 was mixture of 1:1:1 by weight of Iganox1010, Tinuvin 328, and Tinuvin123.

The UV experiments on the urethane specimens were performed using QUV weathering tester from Q-Panel. The exposure time was 48 hours including 4 cycles of 8 hours of UV exposure at irradiance of 0.83 W/m$^2$/nm at 45° C. and 4 hours of condensation at 40° C.

A Minolta spectrophotometer CM-3500d was used for dE*ab measurements. The results are summarized in Table 5.

TABLE 5*

| | Comp Ex 5 75/25E100/E300 dE * ab | | | Ex 5a 95/5E100/Dyhard dE * ab | | | Ex 5b 95/5E100/Dyhard + UV 1 dE * ab | | |
|---|---|---|---|---|---|---|---|---|---|
| | A | B | C | A | B | C | A | B | C |
| 10 min | 22.74 | 1.03 | 0.33 | 2.03 | 0.43 | 0.02 | 0.26 | 0.09 | 0.06 |
| 30 min | 29.39 | 1.12 | 0.44 | 2.14 | 0.4 | 0.08 | 0.27 | 0.13 | 0.01 |
| 1 h | 33.64 | 2.15 | 0.61 | 2.07 | 0.43 | 0.03 | 0.42 | 0.16 | 0.06 |
| 3 h | 40.78 | 2.55 | 1.01 | 4.38 | 0.48 | 0.06 | 0.54 | 0.11 | 0.22 |
| 4 h | 45.06 | 4.45 | 1.67 | 8.01 | 0.32 | 0.05 | 1.47 | 0.17 | 0.06 |
| 28 h | 46.01 | 5.8 | 3.7 | 16.4 | 0.41 | 0.09 | 4.35 | 0.17 | 0.15 |
| 48 h | 46.34 | 6.09 | 3.99 | 20.32 | 0.5 | 0.05 | 6.56 | 0.12 | 0.09 |

*all UV1 amounts based on the final weight of curative not on the final weight of the polyurea.
A: Unpainted
B: One layer of pigmented coating
C: Two layers of pigmented coating These data show that after 48 hours UV exposure, the inventive composition, when coated with only one layer of paint, has a degree of yellowing resistance significantly better than the comparative urethane cover having two layers of pigmented paint both in the absence of additional UV stabilization. When a UV stabilizer package is used in the inventive urethane composition, the non-painted values after 48 hours are equivalent, if not better, than those measured to those of an ionomer covered ball with a clear coat covering.

Example 6

This example concerns the effect of varying curative compositions on unpainted specimens. Five different urethane cover compositions having different curative mixtures were tested for UV resistance. The prepolymer for this example comprised a toluene diisocyanate/PTMEG-based prepolymer. A control composition 6 for this example comprised a pre-polymer containing NCO 5.96%, which was combined with a curative comprising a 75/25 E100/E300 mixture (based on weight percent). For Sample 6A, the pre-polymer was cured with a mixture comprising 94% E100, 6% dicyandiamide, Dyhard (Degussa)/DIDP 25 weight percent [di(propylene glycol)dibenzoate)], and 2.5% Tinuvin B75 (Ciba Specialty Chemicals). For Sample 6B, the pre-polymer was cured with a mixture comprising 96% E100, 4% of Dyhard/Versalink P-1000 15 weight percent (oligomeric diamine [polytetramethyleneoxide-di-p-aminobenzoate], MW 1240, Air Products), and 2.5% Tinuvin B75. For Example 6C, a pre-polymer containing NCO 6.03% was cured by reaction with a mixture of 96% E100, 4% AcetoG/Versalink P-650 (oligomeric diamine [polytetramethyleneoxide-di-p-aminobenzoate], MW 800, Air Products), and 2.5% Tinuvin B75. For Sample 6D, a pre-polymer containing NCO 5.99% was cured by reaction with a mixture of 94% E100, 6% AcetoG/Jeffamine XTJ-510 (oligomeric diamine[polyoxypropylenediamine], MW 4000, Huntsman Corporation) and 2.5% Tinuvin B75. The inventive compositions had approximately the same gel times as the comparative composition. Shear Cut Resistance was also approximately the same for the inventive compositions as the comparative composition.

A urethane dispenser was used for proper mixing of the curative mixtures and obtaining accurate weight of the curative mixture. The FlackTek high speed mixer was used for uniform mixing of prepolymer and curative mixture, and then the mixture was poured into the cavities for molding. The molding temperature was 55° C. for 7 minutes.

The UV experiments on the urethane specimens were performed using QUV weathering tester from Q-Panel. The exposure time was 48 hours including 4 cycles of 8 hours of UV exposure at irradiance of 0.83 W/m²/nm at 45° C. and 4 hours of condensation at 40° C.

A Minolta spectrophotometer CM-3500d was used for dE*ab measurements.

The results of this Example 6 are summarized in Table 6.

TABLE 6

| | Compositions | | Control | A | B | C | D |
|---|---|---|---|---|---|---|---|
| Prepolymers | NCO 5.96% | | x | x | x | | |
| | NCO 6.03% | | | | | x | |
| | NCO 5.99% | | | | | | x |
| Curatives | E100 | | 75 | 94 | 96 | 94 | 94 |
| | E300 | | 25 | | | | |
| | Dyhard/DIDP 25 wt % | | | 6 | | | |
| | Dyhard/P-1000 15 wt % | | | | 4 | | |
| | AcetoG/P-650 25 wt % | | | | | 6 | |
| | AcetoG/XTJ-510 25 wt % | | | | | | 6 |
| | Tinuvin B75 | | | 2.5 | 2.5 | 2.5 | 2.5 |
| Properties | Gel Time | 126° F. | 78.5 | 78.5 | 77.5 | 74 | 66 |
| | (sec) | 145° F. | 58.5 | 58 | 58 | 57 | 55 |
| | dE * ab | Non-painted | 46.3 | 7.12 | 10.52 | 18.8 | 14.2 |
| | Shear Cut Resistance | Non-painted | 1 | 1 | 1 | 1.05 | 1.1 |

These data show the improved UV resistance of the polyurethane covers using the curative mixtures of the present invention as compared to the control polyurethane cover cured with 25% Ethacure 300. Sample 6A has the same gel time and Shear Cut Resistance as the control composition, but has a dE*ab value of 7.12 compared to the control value of 46.3. Sample 6B has substantially the same gel time and has the same Shear Cut Resistance as the control composition, but has a dE*ab value of 10.52. Sample 6C has a slightly reduced gel time and substantially the same Shear Cut Resistance as the control composition, but has a dE*ab value of 18.8. Sample 6D has a reduced gel time and substantially the same Shear Cut Resistance as the control composition, but has a dE*ab value of 14.2.

The present invention has been described with reference to certain exemplary embodiments. A person or ordinary skill in the art will appreciate that the invention is not limited to such features.

We claim:

1. A golf ball comprising a cover layer, a core, and optionally one or more intermediate layers, the cover layer comprising the reaction product of:
   A) one or more polyisocyanates selected from toluene diisocyanate, 4,4'-diphenylmethane diisocyanate, isophorone diisocyanate and any mixtures thereof; PPDI or cyclohexane diisocyanate;
   B) a polyol selected from polytetramethylene ether glycol (PTMG), PPG, or PEG;
   C) a dicyandiamide having a formula

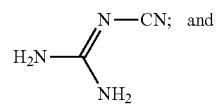

D) the chain extender or curing agent further comprising a compound selected from diethyl-2,4-toluenediamine; 4,4"-methylenebis-(3-chloro,2,6-diethyl)-aniline; 3,5-dimethylthio-2,4-toluenediamine; 3,5-dimethylthio-2,6-toluenediamine; cyclohexyldiamine, diphenylmethane diamine or any and all mixtures thereof.

2. The golf ball of claim 1 wherein one or more intermediate layers comprises a composition selected from:
   A) one or more ionomers selected from unimodal ionomers, bimodal ionomers, modified unimodal ionomers, modified bimodal ionomers, and all combinations thereof;
   B) the reaction product of at least one component 1) that is a monomer, oligomer, prepolymer, or polymer comprising at least 5% by weight of acidic functional groups; at least one component 2) that is a monomer, oligomer, prepolymer, or polymer comprising less by weight of acidic functional groups than the weight percentage of acidic functional groups of the at least one component 1; and at least one component 3) that is a basic metal salt capable of neutralizing the acidic functional groups of component 1, thereby forming a polymer blend composition, wherein the polymer blend composition incorporates an in-situ-formed pseudo-crosslinked network of the at least one component 1 in the presence of the at least one component 2;
   C) a polymer of a $C_{5-12}$ cyclic olefin, and is selected from polypentenamer rubber, polyheptenamer rubber, polyhexenamer rubber polyoctenamer rubber, polydecenamer rubber and polydodecenamer rubber or any and all combinations thereof;

D) a blend composition comprising at least one polyalkenamer and at least one polyamide selected from polyamide elastomers, thermoplastic copolyamides and mixtures thereof; and any and all combinations of A), B), C), and D).

3. The golf ball of claim 2 wherein said one or more intermediate layers further comprises a compound having a general formula $(R_2N)_m—R'-(X(O)_nOR_y)_m$, wherein:

A) R is selected from hydrogen, one or more $C_1-C_{20}$ aliphatic systems, one or more cycloaliphatic systems, one or more aromatic systems, or any and all combinations thereof;

B) R' is a bridging group is selected from one or more unsubstituted $C_1-C_{20}$ straight chain or branched aliphatic or alicyclic groups, one or more substituted straight chain or branched aliphatic or alicyclic groups, one or more aromatic groups, one or more oligomers each containing up to 12 repeating units, or any and all combinations thereof;

C) when X is C or S, m is 1-3;

D) when X=C, n=1 and y=1; and

E) when X=S, n=2 and y=1.

4. The golf ball according to claim 3 wherein the compound having a general formula $(R_2N)_m—R'—(X(O)_nOR_y)_m$ is selected from 4,4'-methylene-bis-(cyclohexylamine) carbamate, 11-aminoundecanoicacid, 12-aminododecanoic acid, epsilon-caprolactam; omega-caprolactam; or any and all combinations thereof.

5. The golf ball according to claim 2 where the cover, core and/or said one or more intermediate layers comprises a compound selected from synthetic and natural rubbers, thermoset polyurethanes and thermoset polyureas, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, polyurethane ionomer, thermoplastic polyurethanes, thermoplastic polyureas, polyamides, copolyamides, polyesters, copolyesters, polycarbonates, polyolefins, halogenated polyolefins, halogenated polyethylenes, polyphenylene oxide, polyphenylene sulfide, diallyl phthalate polymer, polyimides, polyvinyl chloride, polyamide-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane or any and all combinations of such materials.

6. The golf ball according to claim 1 having a cover layer, a core, an inner intermediate layer, and an outer intermediate layer, and wherein:

A) the cover layer comprises the reaction product of 1) one or more polyisocyanates selected from toluene diisocyanate, 4,4'-diphenylmethane diisocyanate, isophorone diisocyanate or any and all mixtures thereof;

2) polytetramethylene ether glycol (PTMG);

3) chain extender or curing agent comprising a)

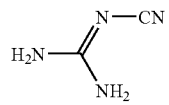

and b) a compound selected from diethyl-2,4-toluenediamine; 4,4"-methylenebis-(3-chloro,2,6-diethyl)-aniline; 3,5-dimethylthio-2,4-toluenediamine; 3,5-dimethylthio-2,6-toluenediamine; or any and all mixtures thereof; and B) the core comprises 1) a polymer selected from 1,2-polybutadiene, cis-1,4-polybutadiene, trans-1,4-polybutadiene, polyoctenamer, cis-polyisoprene, trans-polyisoprene, polychloroprene, polybutylene, or any and all combinations thereof;

2) a cross-linking agent selected from diacetyl peroxide, di-tert-butyl peroxide, dibenzoyl peroxide, dicumyl peroxide, 2,5-dimethyl-2,5-di(benzoylperoxy)hexane, 1,4-bis-(tert-butylperoxyisopropyl)benzene, tert-butylperoxybenzoate, 2,5-dimethyl-2,5-di-(tert-butylperoxy)hexyne, 1,1-bis(tert-butylperoxy)-3,3,5-tri-methylcyclohexane, di-(2,4-dichlorobenzoyl)peroxide, 2,5-dimethyl-2,5-di(tert-butyl peroxy)hexane, 1,4-di-(2-tert-butyl peroxyisopropyl)benzene, tert-butyl perbenzoate, tert-butyl cumyl peroxide, or any and all combinations thereof;

3) from 0 to about 10 parts by weight (per 100 parts by weight of the core) of a peptizer selected from 2,3,5, 6-tetrachloro-4-pyridinethiol, pentachlorothiophenol, dibenzamido diphenyldisulfide, a metal salt of pentachlorothiophenol, an ammonium salt of pentachlorothiophenol with the ammonium cation having the general formula $[NR^1R^2R^3R^4]^+$ where $R^1$, $R^2$, $R^3$, and $R^4$ independently are either hydrogen, or a $C_1-C_{20}$ aliphatic, cycloaliphatic or aromatic system, or any and all combinations thereof; and 4) from 0 to about 20 parts by weight (per 100 parts by weight of the core) of a nanofiller selected from hydrotalcite, montmorillonite, phyllosilicate, saponite, hectorite, beidellite, stevensite, vermiculite, halloysite, mica, micafluoride, octosilicate, or any and all combinations thereof; and C) the inner intermediate layer comprises a unimodal ionomer, a bimodal ionomer, a modified unimodal ionomer, a modified bimodal ionomer, or a polyalkenamer; and D) the outer intermediate layer comprises an injection moldable composition comprising at least one polyalkenamer and at least about 10 weight percent of at least one polyamide, based on the total polymer amount of the intermediate layer.

7. A three-piece golf ball having a cover layer, a core and an intermediate layer, and wherein:

A) the cover layer comprises the reaction product of 1) one or more polyisocyanates selected from toluene diisocyanate, 4,4'-diphenylmethane diisocyanate, isophorone diisocyanate or any and all mixtures thereof;

2) polytetramethylene ether glycol (PTMG),
3) a chain extender or curing agent comprising
   a)

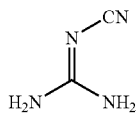

and
   b) a compound selected from diethyl-2,4-toluenediamine; 4,4"-methylenebis-(3-chloro,2,6-diethyl)-aniline; 3,5-dimethylthio-2,4-toluenediamine; 3,5-dimethylthio-2,6-toluenediamine; or any and all mixtures thereof; and
B) the core comprises
   1) a polymer selected from 1,2-polybutadiene, cis-1,4-polybutadiene, trans-1,4-polybutadiene, polyoctenamer, cis-polyisoprene, trans-polyisoprene, polychloroprene, polybutylene, or any and all combinations thereof; and
   2) a cross-linking agent comprising a free radical initiator selected from diacetyl peroxide, di-tert-butyl peroxide, dibenzoyl peroxide, dicumyl peroxide, 2,5-dimethyl-2,5-di(benzoylperoxy)hexane, 1,4-bis-(tert-butylperoxyisopropyl)benzene, tert-butylperoxybenzoate, 2,5-dimethyl-2,5-di-(tert-butylperoxy)hexyne, 1,1-bis(tert-butylperoxy)-3,3,5-tri-methylcyclohexane, di-(2,4-dichlorobenzoyl) peroxide, 2,5-dimethyl-2,5-di(tert-butyl peroxy) hexane, 1,4-di-(2-tert-butyl peroxyisopropyl) benzene, tert-butyl perbenzoate, tert-butyl cumyl peroxide, or any and all combinations thereof;
   3) from 0 to about 10 parts by weight (per 100 parts by weight of the core) of a peptizer selected from 2,3,5,6-tetrachloro-4-pyridinethiol, pentachlorothiophenol, dibenzamido diphenyldisulfide, a metal or non-metal salt of pentachlorothiophenol, an ammonium salt of pentachlorothiophenol with the ammonium cation having the general formula $[NR^1R^2R^3R^4]^+$ where $R^1, R^2, R^3$ and $R^4$ independently are hydrogen, or a $C_1$-$C_{20}$ aliphatic, cycloaliphatic, aromatic, or any and all combinations thereof; and
   4) from 0 to about 20 parts by weight (per 100 parts by weight of the core) of a nanofiller selected from hydrotalcite, montmorillonite, phyllosilicate, saponite, hectorite, beidellite, stevensite, vermiculite, halloysite, mica, micafluoride, octosilicate, or any and all combinations thereof; and
C) the intermediate layer comprises
   1) one or more ionomers selected from unimodal ionomers, bimodal ionomers, modified unimodal ionomers, modified bimodal ionomers, and all combinations thereof;
   2) one or more a polyalkenamers; or
   3) an injection moldable composition comprising at least one polyalkenamer and at least about 10 weight percent of at least one polyamide, based on the total polymer amount of the intermediate layer.
8. A four-piece golf ball having a cover layer, a core an inner intermediate layer, and an outer intermediate layer and wherein:

A) the cover layer comprises the reaction product of
   1) a polyisocyanate selected from toluene diisocyanate, 4,4'-diphenylmethane diisocyanate, isophorone diisocyanate or any mixtures thereof;
   2) polytetramethylene ether glycol (PTMG);
   3) a chain extender or curing agent comprising
      a) a dicyandiamide having a formula

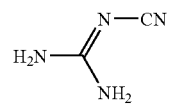

and
B) a compound selected from diethyl-2,4-toluenediamine, 4,4"-methylenebis-(3-chloro,2,6-diethyl)-aniline, 3,5-dimethylthio-2,4-toluenediamine, 3,5-dimethylthio-2,6-toluenediamine, or any and all mixtures thereof; and
C) the core comprises
   1) a polymer selected from 1,2-polybutadiene, cis-1,4-polybutadiene, trans-1,4-polybutadiene, polyoctenamer, cis-polyisoprene, trans-polyisoprene, polychloroprene, polybutylene, or any and combinations thereof;
   2) a cross-linking agent selected from diacetyl peroxide, di-tert-butyl peroxide, dibenzoyl peroxide, dicumyl peroxide, 2,5-dimethyl-2,5-di(benzoylperoxy)hexane, 1,4-bis-(tert-butylperoxyisopropyl)benzene, tert-butylperoxybenzoate, 2,5-dimethyl-2,5-di-(tert-butylperoxy)hexyne, 1,1-bis(tert-butylperoxy)-3,3,5-tri-methylcyclohexane, di-(2,4-dichlorobenzoyl)peroxide, 2,5-dimethyl-2,5-di(tert-butyl peroxy)hexane, 1,4-di-(2-tert-butyl peroxyisopropyl)benzene, tert-butyl perbenzoate, tert-butyl cumyl peroxide, or any and all combinations thereof;
   3) from 0 to about 10 parts by weight (per 100 parts by weight of the core) of a peptizer selected from 2,3,5,6-tetrachloro-4-pyridinethiol, pentachlorothiophenol, dibenzamido diphenyldisulfide, a metal salt of pentachlorothiophenol, an ammonium salt of pentachlorothiophenol with the ammonium cation having the general formula $[NR^1R^2R^3R^4]^+$ where $R^1, R^2, R^3$, and $R^4$ is either hydrogen, or a $C_1$-$C_{20}$ aliphatic, cycloaliphatic or aromatic system, or any and all combinations thereof; and
   4) from 0 to about 20 parts by weight (per 100 parts by weight of the core) of a nanofiller selected from hydrotalcite, montmorillonite, phyllosilicate, saponite, hectorite, beidellite, stevensite, vermiculite, halloysite, mica, micafluoride, octosilicate, or any and all combinations thereof; and
D) the inner intermediate layer comprises an injection moldable composition comprising at least one polyalkenamer and at least about 10 weight percent of at least one polyamide, based on the total polymer amount of the intermediate layer; and
E) the outer intermediate layer comprises a unimodal ionomer, a bimodal ionomer, a modified unimodal ionomer, a modified bimodal ionomer, or a polyalkenamer.

* * * * *